United States Patent
Lou et al.

(10) Patent No.: US 12,143,985 B2
(45) Date of Patent: Nov. 12, 2024

(54) DATA TRANSMISSION METHOD AND APPARATUS

(71) Applicant: Huawei Technologies Co., Ltd., Shenzhen (CN)

(72) Inventors: Chong Lou, Shanghai (CN); Qufang Huang, Shenzhen (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 17/590,519

(22) Filed: Feb. 1, 2022

(65) Prior Publication Data
US 2022/0159685 A1    May 19, 2022

Related U.S. Application Data

(63) Continuation of application No. PCT/CN2019/099131, filed on Aug. 2, 2019.

(51) Int. Cl.
*H04W 72/1268* (2023.01)
*H04W 72/23* (2023.01)
*H04W 74/0833* (2024.01)

(52) U.S. Cl.
CPC ....... *H04W 72/1268* (2013.01); *H04W 72/23* (2023.01); *H04W 74/0833* (2013.01)

(58) Field of Classification Search
None
See application file for complete search history.

(56) References Cited

U.S. PATENT DOCUMENTS

| | | | |
|---|---|---|---|
| 10,333,654 B2 * | 6/2019 | Moon | H04L 1/1819 |
| 2016/0150564 A1 | 5/2016 | Quan et al. | |
| 2019/0149278 A1 * | 5/2019 | Chen | H04W 72/23 |
| | | | 370/336 |

(Continued)

FOREIGN PATENT DOCUMENTS

| | | |
|---|---|---|
| CN | 108307519 A | 7/2018 |
| CN | 108924904 A | 11/2018 |

(Continued)

OTHER PUBLICATIONS

"Remaining issues for EDT," 3GPP TSG-RAN WG2 Meeting#100, Reno, Nevada, USA, R2-1712982, Total 8 pages, 3rd Generation Partnership Project, Valbonne, France (Nov. 27-Dec. 1, 2017).

(Continued)

*Primary Examiner* — Phirin Sam
(74) *Attorney, Agent, or Firm* — Leydig, Voit & Mayer, Ltd.

(57) ABSTRACT

This application provides a data transmission method and apparatus. A terminal: receives a first uplink grant from a network device; sends first uplink data in to-be-sent data to the network device by using the first uplink grant; receives a second uplink grant from the network device; and sends second uplink data to the network device by using the second uplink grant, where the second uplink data is at least a part of uplink data in the to-be-sent data except the first uplink data, where the terminal is in a first state, and where the first state includes an idle state or an inactive state. The embodiments of this application help reduce a latency in a data transmission process.

21 Claims, 15 Drawing Sheets

(56) References Cited

U.S. PATENT DOCUMENTS

| | | | |
|---|---|---|---|
| 2019/0215805 A1* | 7/2019 | Sahlin | H04W 72/04 |
| 2019/0253197 A1* | 8/2019 | Babaei | H04L 1/188 |
| 2019/0254021 A1* | 8/2019 | Hosseini | H04L 1/1812 |
| 2019/0306801 A1* | 10/2019 | Zhou | H04W 52/04 |
| 2020/0092852 A1* | 3/2020 | Zhang | H04W 72/02 |
| 2023/0389037 A1* | 11/2023 | Zacharias | H04W 72/23 |
| 2024/0137864 A1* | 4/2024 | Zhou | H04W 76/15 |

FOREIGN PATENT DOCUMENTS

| | | | |
|---|---|---|---|
| CN | 109587769 A | 4/2019 | |
| CN | 109982440 A | 7/2019 | |
| EP | 3506708 A1 | 7/2019 | |
| WO | 2019031861 A1 | 2/2019 | |

OTHER PUBLICATIONS

Intel Corporation, "Consideration of MsgB contents and design," 3GPP TSG RAN WG2 #106, Reno, Nevada, US, R2-1906280, total 6 pages, 3rd Generation Partnership Project, Valbonne, France (May 13-17, 2019).

\* cited by examiner

DATA TRANSMISSION METHOD AND APPARATUS

CROSS-REFERENCE TO RELATED APPLICATIONS

This application is a continuation of International Application No. PCT/CN2019/099131, filed on Aug. 2, 2019, the disclosure of which is hereby incorporated by reference in its entirety.

TECHNICAL FIELD

This application relates to the communication field, and more specifically, to a data transmission method and apparatus.

BACKGROUND

Typical use cases of the future 5th generation (5G) defined by the third generation partnership project (3GPP) are classified into the following three types: an enhanced mobile broadband (eMBB) service, a massive machine type communication (mMTC) service, and an ultra-reliable low-latency communication (URLLC) service. In these scenarios, how to reduce a transmission latency in a data transmission process becomes a new problem.

For example, internet of things (IoT) terminals (machine type communication (MTC) or narrowband internet of things (NB-IoT) terminals), do not have high requirements on voice, mobility, and rates, but have higher requirements on costs, coverage, and power consumption of the terminals. Because such a terminal can send data to a network device only after establishing a network connection to the network device, and a process in which the terminal establishes the network connection to the network device may consume much signaling, a data transmission latency may be increased.

SUMMARY

This application provides a data transmission method and apparatus, to reduce a latency in a data transmission process.

According to a first aspect, a data transmission method is provided. The method includes: A terminal receives a first uplink grant from a network device; the terminal sends first uplink data in to-be-sent data to the network device by using the first uplink grant; the terminal receives a second uplink grant from the network device; and the terminal sends second uplink data to the network device by using the second uplink grant, where the second uplink data is at least a part of uplink data in the to-be-sent data except the first uplink data, the terminal is in a first state, and the first state includes an idle state or an inactive state.

According to the data transmission method in this embodiment of this application, the terminal may send uplink data to the network device for a plurality of times when the terminal is in the idle state or in the inactive state. Compared with a case in which the terminal sends data to the network device after entering a connected state, this application helps reduce a quantity of times of air interface interaction and a data transmission latency.

In this embodiment of this application, the network device may send the second uplink grant to the terminal, so that when sending of the to-be-sent data of the terminal cannot be completed in the first uplink data or new data arrives after sending of the to-be-sent data is completed, this part of data can be sent to the network device in a timely manner.

In some possible implementations, the second uplink data is uplink data newly arrived after the terminal sends the first uplink data.

With reference to the first aspect, in some implementations of the first aspect, the method further includes: The terminal sends first indication information to the network device, where the first indication information is used to indicate that the to-be-sent data is not completely sent.

In this embodiment of this application, the terminal indicates to the network device that the to-be-sent data is not completely sent, so that the network device may indicate the terminal to continue to remain in the first state to send uplink data. Compared with a case in which the terminal sends data to the network device after entering the connected state, this application helps reduce a quantity of times of air interface interaction and a data transmission latency.

In some possible implementations, the first indication information is used to indicate that the terminal expects to complete data sending in the idle state or the inactive state, the first indication information is used to indicate that the terminal has other uplink data, or the first indication information is used to request the second uplink grant.

With reference to the first aspect, in some implementations of the first aspect, the first indication information includes information used to indicate a data volume of remaining uplink data in the to-be-sent data.

In some possible implementations, the first indication information is used to indicate a data volume of the to-be-sent data, and the data volume of the to-be-sent data herein is actually a volume of data remained after the terminal completes sending of the first uplink data. For example, the first indication information is used to indicate a data volume of available data obtained after a media access control protocol data unit (MAC PDU) is assembled into a packet. For example, a value of the data volume may be 0.

In this embodiment of this application, the terminal indicates the data volume of the to-be-sent data in the first indication information. This helps the network device determine whether a terminal state needs to be adjusted, and helps reduce a quantity of times of air interface interaction and a data transmission latency. In addition, if the network device determines that the data volume of the to-be-sent data is relatively small (where for example, the network device determines that the terminal can send all of the to-be-sent data by using the second uplink grant), the network device may indicate the terminal to continue to remain in the first state, thereby helping reduce power consumption of the terminal.

In some possible implementations, the first indication information is indicated by using one or more of a radio resource control (RRC) indication, a buffer status report (BSR) indication, simplified L2 signaling, or L1 signaling.

With reference to the first aspect, in some implementations of the first aspect, the method further includes: The terminal receives second indication information from the network device, where the second indication information is used to indicate the terminal to remain in the first state.

In some possible implementations, the second indication information may be carried in an RRC message, for example, an RRC release message, an RRC resume message, or an RRC reconfiguration message.

In this embodiment of this application, after receiving the first uplink data, the network device may indicate the terminal to continue to remain in the first state. This helps reduce power consumption of the terminal.

With reference to the first aspect, in some implementations of the first aspect, the method further includes: The terminal sends third indication information to the network device, where the third indication information is used to indicate that sending of the to-be-sent data is completed; and the terminal receives fourth indication information from the network device, where the fourth indication information is used to indicate the terminal to remain in the first state.

In some possible implementations, the second indication information is the same as the fourth indication information.

In some possible implementations, the terminal may not send the first indication information to the network device, but send the third indication information to the network device (where in this case, the terminal may still have to-be-sent data to send). After receiving the third indication information, the network device may send the fourth indication information to the terminal, to indicate the terminal to continue to remain in the first state. For example, the third indication information may be a BSR, and a data volume in a buffer status in the BSR is set to 0.

It should be understood that, that the third indication information is used to indicate that sending of the to-be-sent data is completed may also be understood as: The third indication information is used to indicate that the terminal does not have other uplink data and/or downlink data, or the third indication information is used to indicate that the terminal sends the to-be-sent data in the first state, and does not need to switch to the connected state to send the to-be-sent data.

In this embodiment of this application, after determining that the terminal does not have other uplink data, the network device may indicate the terminal to continue to remain in the first state. This helps reduce power consumption of the terminal.

With reference to the first aspect, in some implementations of the first aspect, the sending first uplink data in to-be-sent data to the network device includes: The terminal sends a first message of a random access procedure to the network device, where the first message of the random access procedure includes the first uplink data.

The data transmission method in this embodiment of this application may be applied to the random access procedure. The terminal may include the first uplink data in the first message of random access, and the terminal may send uplink data in the first state for a plurality of times. Compared with a case in which the terminal sends data to the network device after entering the connected state, this application helps reduce a quantity of times of air interface interaction and a data transmission latency.

In some possible implementations, the first message of the random access procedure further includes signaling, and the signaling is used to initiate the random access procedure.

In some possible implementations, the signaling may be a random access preamble.

With reference to the first aspect, in some implementations of the first aspect, that the terminal receives a second uplink grant from the network device includes: The terminal receives, from the network device, a second message of the random access procedure, where the second message of the random access procedure includes the second uplink grant.

The data transmission method in this embodiment of this application may be applied to the random access procedure. The network device may include the second uplink grant in the second message of the random access procedure, and the second uplink grant is used by the terminal to newly transmit data. The terminal may continue to send uplink data in the first state. This helps reduce a quantity of times of air interface interaction and a data transmission latency.

With reference to the first aspect, in some implementations of the first aspect, the sending second uplink data to the network device includes: The terminal sends a first message of another random access procedure to the network device, where the first message of the another random access procedure message includes the second uplink data.

The data transmission method in this embodiment of this application may be applied to the random access procedure. The terminal may send the first message of the random access procedure to the network device for a plurality of times, and include uplink data in the first message of the random access procedure, to send the uplink data in the first state. This helps reduce a quantity of times of air interface interaction and a data transmission latency.

With reference to the first aspect, in some implementations of the first aspect, the method further includes: The terminal receives, from the network device, a second message of the random access procedure, where the second message of the random access procedure includes a third uplink grant, and the third uplink grant is used to retransmit the first uplink data; and the terminal retransmits the first uplink data by using the third uplink grant.

With reference to the first aspect, in some implementations of the first aspect, the second uplink grant is a preconfigured uplink grant.

With reference to the first aspect, in some implementations of the first aspect, the sending first uplink data in to-be-sent data to the network device includes: sending the first uplink data to the network device when a preset condition is met, where the preset condition includes one or more of the following: the terminal determines that the to-be-sent data exists; the terminal determines that a data volume of the to-be-sent data is less than or equal to a preset threshold; the terminal receives fifth indication information from the network device, where the fifth indication information is used to indicate the terminal to send the to-be-sent data to the network device; and the terminal determines that the to-be-sent data is a service data unit SDU.

According to the data transmission method in this embodiment of this application, the terminal may send uplink data in the first state after determining that the preset condition is met. Compared with a case in which the terminal sends data to the network device after entering the connected state, this application helps reduce a quantity of times of air interface interaction and a data transmission latency.

With reference to the first aspect, in some implementations of the first aspect, that a terminal receives a first uplink grant from a network device includes: The terminal receives radio resource control RRC signaling from the network device, where the RRC signaling includes the first uplink grant.

According to a second aspect, a data transmission method is provided. The method includes: A network device sends a first uplink grant to a terminal; the network device receives first uplink data that is in to-be-sent data and that is sent by the terminal by using the first uplink grant; the network device sends a second uplink grant to the terminal; and the network device receives second uplink data sent by the terminal by using the second uplink grant, where the second uplink data is at least a part of uplink data in the to-be-sent data except the first uplink data, the terminal is in a first state, and the first state includes an idle state or an inactive state.

In some possible implementations, the second uplink data is uplink data newly arrived after the terminal sends the first uplink data.

With reference to the second aspect, in some implementations of the second aspect, the method further includes: The network device receives first indication information from the terminal, where the first indication information is used to indicate that the to-be-sent data is not completely sent.

With reference to the second aspect, in some implementations of the second aspect, the first indication information includes information used to indicate a data volume of remaining uplink data in the to-be-sent data.

With reference to the second aspect, in some implementations of the second aspect, the method further includes: The network device sends second indication information to the terminal, where the second indication information is used to indicate the terminal to remain in the first state.

With reference to the second aspect, in some implementations of the second aspect, the method further includes: The network device receives third indication information from the terminal, where the third indication information is used to indicate that sending of the to-be-sent data is completed; and the network device sends fourth indication information to the terminal based on the third indication information, where the fourth indication information is used to indicate the terminal to remain in the first state.

With reference to the second aspect, in some implementations of the second aspect, the method further includes: The network device receives fifth indication information, where the fifth indication information is used to indicate that there is no downlink data of the terminal. That the network device sends fourth indication information to the terminal based on the third indication information includes: The network device sends the fourth indication information to the terminal based on the third indication information and the fifth indication information.

With reference to the second aspect, in some implementations of the second aspect, the fifth indication information is used to indicate whether there is downlink data of the terminal, a value of the fifth indication information is a first value, and the first value is used to indicate that there is no downlink data of the terminal.

With reference to the second aspect, in some implementations of the second aspect, that the network device receives first uplink data that is in to-be-sent data and that is sent by the terminal by using the first uplink grant includes: The network device receives a first message of a random access procedure from the terminal, where the first message of the random access procedure includes the first uplink data.

With reference to the second aspect, in some implementations of the second aspect, that the network device sends a second uplink grant to the terminal includes: The network device sends a second message of the random access procedure to the terminal, where the second message of the random access procedure includes the second uplink grant.

With reference to the second aspect, in some implementations of the second aspect, that the network device receives second uplink data sent by the terminal by using the second uplink grant includes: The network device receives a first message of another random access procedure from the terminal, where the first message of the another random access procedure includes the second uplink data.

With reference to the second aspect, in some implementations of the second aspect, the method further includes: The network device sends a second message of the random access procedure to the terminal, where the second message of the random access procedure includes a third uplink grant, and the third uplink grant is used to retransmit the first uplink data; and the network device receives the first uplink data retransmitted by the terminal by using the third uplink grant.

With reference to the second aspect, in some implementations of the second aspect, the second uplink grant is a preconfigured uplink grant.

With reference to the second aspect, in some implementations of the second aspect, that a network device sends a first uplink grant to a terminal includes: The network device sends RRC signaling to the terminal, where the RRC signaling includes the first uplink grant.

According to a third aspect, a data transmission method is provided. The method includes: A terminal in a first state sends first indication information to a network device, where the first indication information is used to indicate that the terminal has to-be-sent data, and the first state includes an idle state or an inactive state; the terminal receives second indication information from the network device, where the second indication information is used to indicate the terminal to switch to a connected state; and the terminal in the connected state sends the to-be-sent data to the network device.

In this embodiment of this application, when the terminal has to-be-sent data, the terminal may send the first indication information to the network device, and the network device may indicate in a timely manner the terminal to switch from the first state to the connected state, to complete uplink data sending.

In some possible implementations, the first indication information is used to indicate that the terminal expects to complete data sending in the idle state or the inactive state, or the first indication information is used to indicate that the terminal has other uplink data.

In some possible implementations, the first indication information includes information used to indicate a data volume of the to-be-sent data.

In this embodiment of this application, the terminal indicates the data volume of the to-be-sent data in the first indication information. This helps the network device determine whether a terminal state needs to be adjusted, and helps reduce a quantity of times of air interface interaction and a data transmission latency. In addition, if the network device determines that the data volume of the to-be-sent data is relatively large (where for example, the network device determines that the terminal cannot send all of the to-be-sent data by using the second uplink grant), the network device may indicate the terminal to switch to the connected state.

In some possible implementations, the first indication information is indicated by using one or more of an RRC indication, a BSR indication, simplified L2 signaling, or L1 signaling.

With reference to the third aspect, in some implementations of the third aspect, the method further includes: The terminal receives a first uplink grant from the network device; and the terminal in the first state sends first uplink data to the network device by using the first uplink grant, where the first indication information is used to indicate that in addition to the first uplink data, the terminal has other to-be-sent data.

In some possible implementations, that the terminal receives a first uplink grant from the network device includes: The terminal receives radio resource control RRC signaling from the network device, where the RRC signaling includes the first uplink grant.

In some possible implementations, the to-be-sent data may be uplink data newly arrived after the terminal sends the first uplink data, or may be uplink data remained after the terminal sends the first uplink data.

According to the data transmission method in this embodiment of this application, the terminal may send uplink data to the network device for a plurality of times when the terminal is in the first state and the connected state. Compared with a case in which the terminal sends data to the network device after entering a connected state, this application helps reduce a quantity of times of air interface interaction and a data transmission latency.

With reference to the third aspect, in some implementations of the third aspect, the sending first uplink data to the network device includes: The terminal sends a first message of a random access procedure to the network device, where the first message of the random access procedure includes the first uplink data.

The data transmission method in this embodiment of this application may be applied to the random access procedure. The terminal may include the first uplink data in the first message of random access, and the terminal may send uplink data in the first state and the connected state for a plurality of times. Compared with a case in which the terminal sends data to the network device after entering the connected state, this application helps reduce a quantity of times of air interface interaction and a data transmission latency.

With reference to the third aspect, in some implementations of the third aspect, the first message of the random access procedure further includes the first indication information.

With reference to the third aspect, in some implementations of the third aspect, that the terminal receives a first uplink grant from the network device includes: The terminal receives RRC signaling from the network device, where the RRC signaling includes the first uplink grant.

With reference to the third aspect, in some implementations of the third aspect, that the terminal receives second indication information from the network device includes: The terminal receives, from the network device, a second message of the random access procedure, where the second message of the random access procedure includes the second indication information.

With reference to the third aspect, in some implementations of the third aspect, the method further includes: The terminal sends third indication information to the network device, where the third indication information is used to indicate that sending of the to-be-sent data is completed; and the terminal receives fourth indication information from the network device, where the fourth indication information is used to indicate the terminal to switch to the first state.

According to a fourth aspect, a data transmission method is provided. The method includes: A network device receives first indication information from a terminal in a first state, where the first indication information is used to indicate that the terminal has to-be-sent data, and the first state includes an idle state or an inactive state; the network device sends second indication information to the terminal, where the second indication information is used to indicate the terminal to switch to a connected state; and the network device receives the to-be-sent data sent by the terminal in the connected state.

With reference to the fourth aspect, in some implementations of the fourth aspect, the method further includes: The network device sends a first uplink grant to the terminal; and the network device receives first uplink data sent by the terminal in the first state by using the first uplink grant, where the first indication information is used to indicate that in addition to the first uplink data, the terminal has other to-be-sent data.

With reference to the fourth aspect, in some implementations of the fourth aspect, that the network device receives first uplink data sent by the terminal in the first state by using the first uplink grant includes: The network device receives a first message of a random access procedure from the terminal, where the first message of the random access procedure includes the first uplink data.

With reference to the fourth aspect, in some implementations of the fourth aspect, the first message of the random access procedure further includes the first indication information.

With reference to the fourth aspect, in some implementations of the fourth aspect, that the network device sends a first uplink grant to the terminal includes: The network device sends RRC signaling to the terminal, where the RRC signaling includes the first uplink grant.

With reference to the fourth aspect, in some implementations of the fourth aspect, that the network device sends second indication information to the terminal includes: The network device sends a second message of the random access procedure to the terminal, where the second message of the random access procedure includes the second indication information.

With reference to the fourth aspect, in some implementations of the fourth aspect, the method further includes: The network device receives third indication information from the terminal, where the third indication information is used to indicate that sending of the to-be-sent data is completed; and the network device sends fourth indication information to the terminal based on the third indication information, where the fourth indication information is used to indicate the terminal to switch to the first state.

With reference to the fourth aspect, in some implementations of the fourth aspect, the method further includes: The network device receives fifth indication information, where the fifth indication information is used to indicate that there is no downlink data of the terminal. That the network device sends fourth indication information to the terminal based on the third indication information includes: The network device sends the fourth indication information to the terminal based on the third indication information and the fifth indication information.

With reference to the fourth aspect, in some implementations of the fourth aspect, the fifth indication information is used to indicate whether there is downlink data of the terminal, a value of the fifth indication information is a first value, and the first value is used to indicate that there is no downlink data of the terminal.

According to a fifth aspect, a data transmission method is provided. The method includes: A network device receives first indication information, where the first indication information is used to indicate that there is no downlink data of a terminal; and the network device sends second indication information to the terminal based on the first indication information, where the second indication information is used to indicate the terminal to remain in or switch to a first state, and the first state includes an idle state or an inactive state.

According to the data transmission method in this embodiment of this application, after the network device receives the indication information indicating that there is no downlink data of the terminal, the network device may indicate the terminal to remain in the first state or switch to the first state. This helps reduce power consumption of the terminal.

In some possible implementations, that a network device receives first indication information includes: The network device receives the first indication information sent by another network device.

In some possible implementations, the network device may be an access network device, and the another network device may be a core network device.

It should be understood that the method in the fifth aspect in this embodiment of this application may be combined with any method in the first aspect to the fourth aspect.

With reference to the fifth aspect, in some implementations of the fifth aspect, the method further includes: The network device receives third indication information, where the third indication information is used to indicate that the terminal has no uplink data. That the network device sends second indication information to the terminal based on the first indication information includes: The network device sends the second indication information to the terminal based on the first indication information and the third indication information.

With reference to the fifth aspect, in some implementations of the fifth aspect, the first indication information is used to indicate whether there is downlink data of the terminal, a value of the first indication information is a first value, and the first value is used to indicate that there is no downlink data of the terminal.

According to a sixth aspect, a data transmission method is provided. The method includes: A network device sends first indication information to another network device, where the first indication information is used to indicate that there is no downlink data of a terminal.

With reference to the sixth aspect, in some implementations of the sixth aspect, the first indication information is used to indicate whether there is downlink data of the terminal, a value of the first indication information is a first value, and the first value is used to indicate that there is no downlink data of the terminal.

With reference to the sixth aspect, in some implementations of the sixth aspect, the network device is a core network device, and the another network device is an access network device.

According to a seventh aspect, a data transmission apparatus is provided. The apparatus includes units or means configured to perform the steps in the first or the third aspect.

According to an eighth aspect, a data transmission apparatus is provided. The apparatus includes units or means configured to perform the steps in the second, the fourth, or the fifth aspect.

According to a ninth aspect, a data transmission apparatus is provided. The apparatus includes units or means used to perform the steps in the sixth aspect.

According to a tenth aspect, a data transmission apparatus is provided. The apparatus includes at least one processor and a memory, and the at least one processor is configured to perform the method according to the first or the third aspect.

According to an eleventh aspect, a data transmission apparatus is provided. The apparatus includes at least one processor and a memory, and the at least one processor is configured to perform the method according to the second, the fourth, or the fifth aspect.

According to a twelfth aspect, a data transmission apparatus is provided. The apparatus includes at least one processor and a memory, and the at least one processor is configured to perform the method according to the sixth aspect.

According to a thirteenth aspect, a data transmission apparatus is provided. The apparatus includes at least one processor and an interface circuit, and the at least one processor is configured to perform the method according to the first or the third aspect.

According to a fourteenth aspect, a data transmission apparatus is provided. The apparatus includes at least one processor and an interface circuit, and the at least one processor is configured to perform the method according to the second, the fourth, or the fifth aspect.

According to a fifteenth aspect, a data transmission apparatus is provided. The apparatus includes at least one processor and an interface circuit, and the at least one processor is configured to perform the method according to the sixth aspect.

According to a sixteenth aspect, a terminal is provided. The terminal includes the apparatus according to the seventh aspect, the terminal includes the apparatus according to the tenth aspect, or the terminal includes the apparatus according to the thirteenth aspect.

According to a seventeenth aspect, an access network device is provided. The access network device includes the apparatus according to the eighth aspect, the apparatus according to the eleventh aspect, or the apparatus according to the fourteenth aspect.

According to an eighteenth aspect, a core network device is provided. The core network device includes the apparatus according to the ninth aspect, the apparatus according to the twelfth aspect, or the apparatus according to the fifteenth aspect.

According to a nineteenth aspect, a program is provided. When being executed by a processor, the program is used to perform the method according to any one of the first aspect to the sixth aspect.

According to a twentieth aspect, this application provides a program product, for example, a computer-readable storage medium, including the program in the nineteenth aspect.

DESCRIPTION OF EMBODIMENTS

Figure 1:
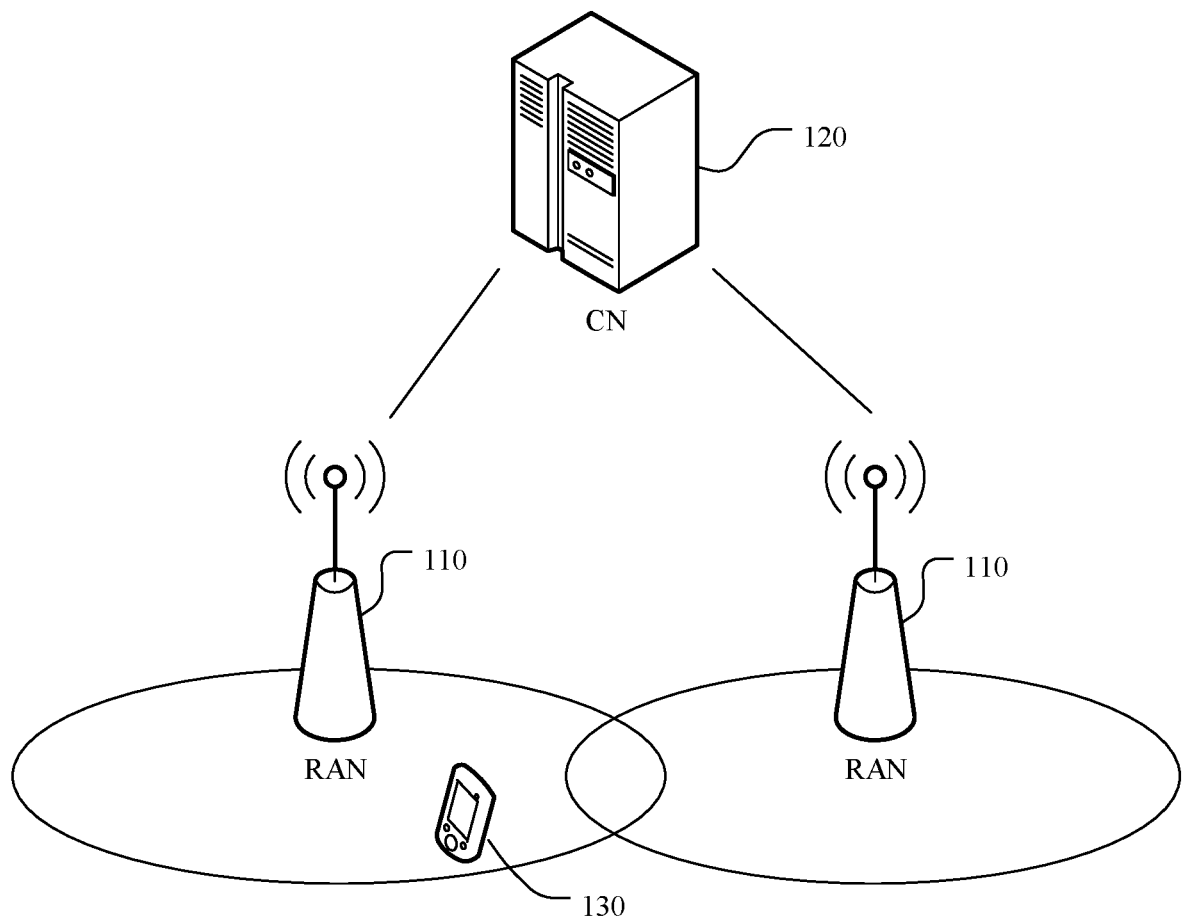
FIG. 1 is a schematic diagram of a communication system according to an embodiment of this application.

The following describes some terms in this application.

(1) A terminal is also referred to as a user equipment (UE), a mobile station (MS), a mobile terminal (MT), or the like, and is a device that provides voice/data connectivity for a user, for example, a handheld device or a vehicle-mounted device with a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

(2) A network device is a device in a wireless network, for example, a radio access network (RAN) node that enables a terminal to access the wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The technical solutions of the embodiments of this application may be applied to various communication systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5G system, or a new radio (NR) system.

Before the embodiments of this application are described, several concepts related to the embodiments of this application are first briefly described.

Scheduling process: The network device may schedule the terminal to perform uplink transmission in two manners: dynamic scheduling and preconfigured resource scheduling. For example, the network device indicates, by sending a dynamic UL grant or a preconfigured UL grant, the terminal to send uplink data.

Dynamic scheduling: The network device sends an uplink scheduling grant (uplink grant, UL grant), sends DCI, that is, a dynamic UL grant, on a physical downlink control channel (PDCCH), and performs scrambling by using a terminal identifier. If successfully decoding the control information, the terminal may obtain a size of a physical layer resource corresponding to this uplink scheduling, time domain/frequency domain distribution of the physical layer resource, and HARQ information required for this uplink scheduling transmission. In this way, the terminal performs a HARQ process to complete uplink transmission.

Preconfigured resource scheduling: The network device may further preconfigure, in a semi-static resource allocation manner, a resource required by the terminal for uplink transmission, that is, preconfigure a UL grant. It should be understood that the preconfigured UL grant may appear periodically, and the terminal does not need to obtain an uplink grant each time before uplink transmission. For example, the network device may configure a UL grant for uplink transmission by using radio resource control (RRC) signaling, and may further configure a period of the preconfigured UL grant, so that the terminal performs transmission on the preconfigured resource scheduling. This manner may be a configured grant manner 1 (configured grant type 1). The network device may further configure a portion of information of uplink transmission, for example, the period of the preconfigured UL grant, by using the RRC signaling, and carry the UL grant for uplink transmission in physical layer signaling and activate a resource of the uplink transmission, so that the terminal performs transmission on the preconfigured resource scheduling. This manner may be a configured grant manner 2 (configured grant type 2), and both the foregoing two manners may be referred to as preconfigured resource scheduling.

It should be noted that, in this embodiment of this application, the "uplink grant" and the "uplink grant message" may be understood as signaling used to schedule a physical uplink resource, for example, downlink control information used for the uplink grant, or RRC signaling used for a semi-static configuration, or downlink control information used to activate an uplink grant resource in a semi-static configuration manner. An "uplink grant resource" may be understood as a resource indicated by an uplink grant. In an LTE or NR protocol, the "uplink grant", the "uplink grant message", and the "uplink grant resource" may all correspondingly be the UL grant, and a person skilled in the art may understand meanings of the "uplink grant", the "uplink grant message", and the "uplink grant resource".

It should be further noted that in the embodiments of this application, the "protocol" may be a standard protocol in the communication field, for example, the "protocol" may include an LTE protocol, an NR protocol, and a related protocol applied to a future communication system. This is not limited in this application.

FIG. 1 is a schematic diagram of a communication system 100 according to an embodiment of this application. As shown in FIG. 1, a terminal 130 accesses a wireless network, to obtain a service of an external network (for example, the internet) by using the wireless network, or to communicate with another terminal by using the wireless network. The wireless network includes a RAN 110 and a core network (CN) 120. The RAN 110 is used to connect the terminal 130 to the wireless network, and the CN 120 is used to manage the terminal device and provide a gateway for communicating with the external network.

It should be understood that the data transmission method provided in this application is applicable to a wireless communication system, for example, the wireless communication system 100 shown in FIG. 1. There is a wireless communication connection between two communication apparatuses in the wireless communication system. One of the two communication apparatuses may correspond to the terminal 130 shown in FIG. 1, for example, may be the terminal 130 in FIG. 1, or may be a chip disposed in the terminal 130. The other communication apparatus in the two communication apparatuses may correspond to the RAN 110 shown in FIG. 1, for example, may be the RAN 110 in FIG. 1, or may be a chip disposed in the RAN 110.

Without loss of generality, the following describes the embodiments of this application in detail by using an interaction process between a terminal and a network device as an example. It may be understood that any terminal in the wireless communication system may communicate, based on a same method, with one or more network devices having a wireless communication connection. This is not limited in this application.

It should be understood that, for the communication system shown in FIG. 1, the network device may be the RAN 110 in FIG. 1, and the terminal may be the terminal 130 in FIG. 1.

Figure 2:
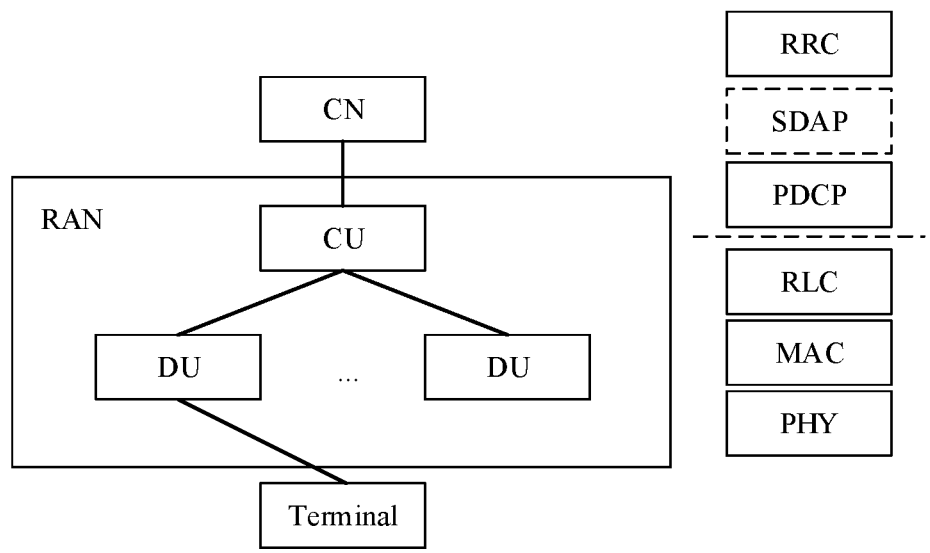
FIG. 2 is a schematic diagram of a network architecture according to an embodiment of this application.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated with the baseband apparatus into one physical apparatus, or some remote parts are integrated with the baseband apparatus. For example, in an LTE communication system, an eNB serving as the RAN device includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal complies with a specific protocol layer structure. For example, a control plane protocol layer structure may include functions of protocol layers such as an RRC layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an implementation, a service data adaptation protocol (SDAP) layer is further included above the PDCP layer.

Figure 3:
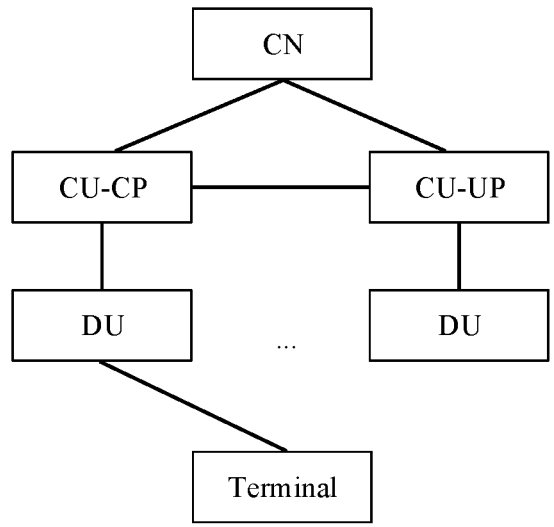
FIG. 3 is a schematic diagram of another network architecture according to an embodiment of this application.

The functions of these protocol layers may be implemented by one node, or may be implemented by a plurality of nodes. For example, in an evolved structure, a RAN device may include a centralized unit (CU) and a distributed unit (DU). A plurality of DUs may be centrally controlled by one CU. As shown in FIG. 3, the CU and the DU may be divided based on protocol layers of a wireless network. For example, functions of the PDCP layer and protocol layers above the PDCP layer are set on the CU, and functions of protocol layers below the PDCP layer, such as the RLC layer and the MAC layer, are set on the DU.

Division based on the protocol layer is merely an example, and division may alternatively be performed based on another protocol layer, such as the RLC layer. Functions of both the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, the division may alternatively be performed in another manner. For example, the division is performed based on a latency. A function whose processing time needs to meet a latency requirement is set on the DU, and a function whose processing time does not need to meet the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

FIG. 3 is a schematic diagram of another network architecture according to an embodiment of this application. Different from the architecture shown in FIG. 2, in this architecture, a control plane (CP) and a user plane (UP) of a CU may be further separated, and are implemented by a control plane CU entity (CU-CP entity) and a user plane CU entity (CU-UP entity) respectively.

In the foregoing network architecture, signaling generated by the CU may be sent to a terminal by using a DU, or signaling generated by a terminal may be sent to the CU after being received by the DU. The DU may transparently transmit the signaling to the terminal or the CU by directly encapsulating the signaling at a protocol layer without parsing the signaling. In the following embodiments, if transmission of such signaling between the CU and the terminal is included, that the DU sends or receives the signaling includes this scenario. For example, signaling at the RRC layer or the PDCP layer is finally processed as data at a physical layer and sent to the terminal, or is converted from received data at a physical layer. In this architecture, it may also be considered that the signaling at the RRC layer or the PDCP layer is sent by the DU, or sent by the DU and radio frequency apparatus.

In the foregoing embodiments, the CU is classified as a network device on a RAN side. In addition, the CU may alternatively be classified as a network device on a CN side. This is not limited herein.

An apparatus in the following embodiments of this application may be located in a terminal or a network device based on functions implemented by the apparatus. When the foregoing CU-DU structure is used, a network device may be a CU node, a DU node, or a network device including a CU node and a DU node.

Figure 4:
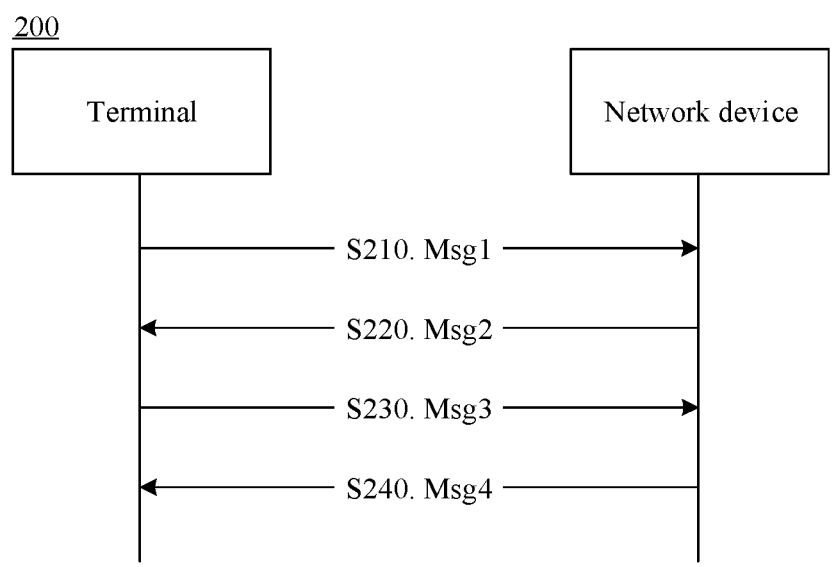
FIG. 4 is a schematic flowchart of completing random access by a terminal and a network device in four steps.

FIG. 4 is a schematic flowchart of completing random access by a terminal and a network device in four steps. It should be understood that, in FIG. 4, contention-based random access (CBRA) is used as an example, and the process includes the following steps.

S210. The terminal sends a random access procedure message 1 (Msg1) to the network device.

It should be understood that the random access procedure message 1 (Msg1) may also be referred to as a random access request message or a random access preamble sequence (preamble).

A main function of the preamble is to notify the network device that there is a random access request, so that the network device can estimate a transmission latency between the network device and the terminal. This helps the network device calibrate uplink timing and notify the terminal of calibration information through a random access procedure message 2 (Msg2) in S220.

Each cell has 64 available preamble sequences, and the terminal may select a preamble for transmission on a physical random access channel (PRACH). The network device notifies, through a system message, the terminal of a time-frequency resource set of PRACHs that can be used to transmit the preamble in a current cell. When initiating random access, the terminal selects a PRACH resource, to send the preamble.

S220. The network device sends the random access procedure message 2 (Msg2) to the terminal.

It should be understood that the random access procedure message 2 (Msg2) may also be referred to as a random access response message.

Specifically, after receiving the preamble sent by the terminal, the network device sends a corresponding random access response (RA response, or RAR) to the terminal. The corresponding random access response may include at least one of the following parameters: time domain information and frequency domain information for transmitting a random access procedure message 3 (Msg3) in S230, a modulation and coding scheme used for the Msg3, a preamble identifier, timing advance (TA) information, and initial uplink grant (UL grant) information. In addition, identification information of the terminal may be further carried. For the CBRA, after receiving the Msg2, the terminal determines whether the preamble identifier in the Msg2 is the same as that of the preamble sent in S210. If the preamble identifier in the Msg2 is the same as that of the preamble sent in S310, it is considered that the Msg2 is successfully received; otherwise, it is considered that the Msg2 fails to be received, and the terminal may re-trigger a random access (RA) procedure.

S230. The terminal sends the random access procedure message 3 (Msg3) to the network device.

Specifically, the terminal sends data by using a physical uplink shared channel (PUSCH) on a corresponding uplink transmission resource based on the UL grant information indicated in the Msg2, where the data may include at least one of the following types of data:

(1) User plane data: includes to-be-sent data of a user. When at least one logical channel is configured for the terminal, the user plane data may include data on the at least one logical channel. In a possible manner, the user plane data may be carried in a non-access stratum (NAS) message. The NAS message may be included in an RRC message. In another possible manner, the user plane data and an RRC message may be multiplexed together, instead of being included in the RRC message.

(2) RRC message: includes the identification information of the terminal, for example, C-RNTI information of the terminal, or a resume identifier (Resume ID) or an inactive identifier (inactive RNTI, I-RNTI) of the terminal. The resume ID or the I-RNTI is allocated by the network device to the terminal. The identifier reported by the terminal is used by the network device to identify an identity of the terminal and related configuration information. The identification information of the terminal may be carried in the RRC message, or may be carried in a MAC PDU that carries the RRC message.

S240. The network device sends a random access procedure message 4 (Msg4) to the terminal.

Specifically, because the terminal carries the identification information of the terminal in S230, in a contention resolution mechanism, the network device carries the identification information of the terminal by using the Msg4 in S240, to specify a terminal that wins in contention resolution, and another terminal that does not win in contention resolution re-initiates random access. Optionally, the Msg4 may further carry user plane data. In a possible manner, the user plane data may be carried in a NAS message, and the NAS message may be included in an RRC message. In another possible manner, the user plane data and an RRC message may be multiplexed together, instead of being included in the RRC message.

Figure 5:
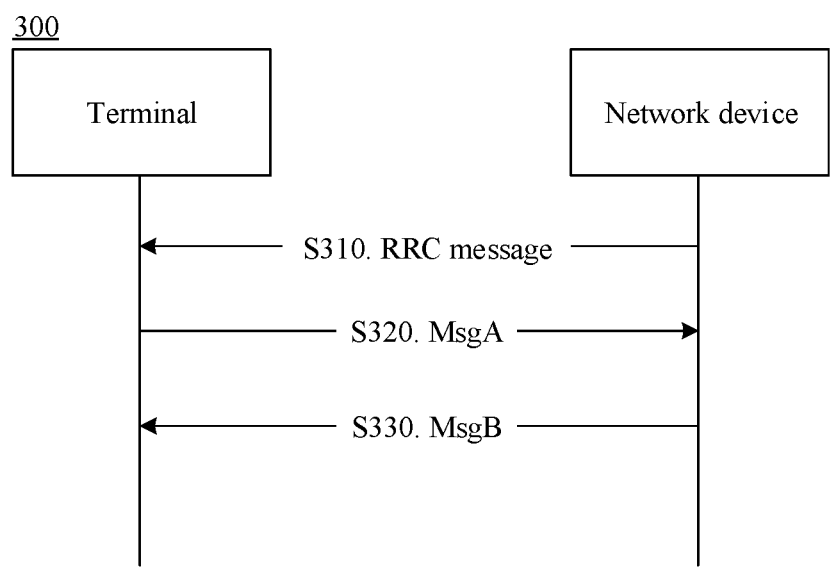
FIG. 5 is a schematic flowchart of completing random access by a terminal and a network device in two steps.

FIG. 5 is a schematic flowchart of completing random access by a terminal and a network device in two steps, and the process includes the following steps.

S310. The network device sends an RRC message to the terminal.

It should be understood that the RRC message may be sent to the terminal in a broadcast manner (for example, by using a system message), or may be sent to the terminal by using RRC dedicated signaling.

Specifically, the RRC message may include UL grant information, and may include time domain information and frequency domain information for transmitting a random access procedure message 1 (MsgA) in S320, a modulation and coding scheme used for the MsgA, and the like.

S320. The terminal sends the random access procedure message 1 (MsgA) to the network device.

It should be understood that the random access procedure message 1 (MsgA) may also be referred to as a random access request message, and the message 1 (MsgA) may include at least one of the following signals:

(1) Preamble: Optionally, the network device may further perform channel estimation based on the preamble, to perform receive-end signal processing of data.

(2) Demodulation reference signal (DMRS): The demodulation reference signal is used for related receive end signal processing such as data demodulation.

The message 1 (MsgA) may further carry data, and the data includes at least one of the following types of data:

(1) User plane data: includes to-be-sent data of a user. When at least one logical channel is configured for the terminal, the user plane data may include data on the at least one logical channel. In a possible manner, the user plane data may be carried in a NAS message. The NAS message may be included in an RRC message. In another possible manner, the user plane data and an RRC message may be multiplexed together, instead of being included in the RRC message.

(2) RRC message: includes the identification information of the terminal, for example, C-RNTI information of the terminal, or a resume identifier (Resume ID) or an inactive identifier (inactive RNTI, I-RNTI) of the terminal. The resume ID or the I-RNTI is allocated by the network device to the terminal. The identifier reported by the terminal is used by the network device to identify an identity of the terminal and related configuration information. The identification information of the terminal may be carried in the RRC message, or may be carried in a MAC PDU that carries the RRC message.

Specifically, the terminal sends the data on a corresponding uplink transmission resource, through a physical layer channel, based on the UL grant information indicated in the RRC message in S310. The physical layer channel may be a PUSCH channel, or may be a contention-based physical layer channel different from the PUSCH. This is not limited herein.

S330. The network device sends a random access procedure message 2 (MsgB) to the terminal.

It should be understood that the random access procedure message 2 (MsgB) may also be referred to as a random access response message.

Specifically, after receiving the MsgA sent by the terminal, the network device sends a corresponding random access response (RA response, RAR) to the terminal. Optionally, the network device may further send an RRC message. Optionally, the MsgB may further carry user plane data. In a possible manner, the user plane data may be carried in a NAS message, and the NAS message may be included in an RRC message. In another possible manner, the user plane data and an RRC message may be multiplexed together, instead of being included in the RRC message. The RAR and the RRC message may include at least one of the following parameters: a preamble identifier, timing advance (TA) information, and uplink grant (UL grant) information, and may further carry a contention resolution identity.

Optionally, if the MsgB includes the preamble identifier, after receiving the MsgB, the terminal determines whether the preamble identifier in the MsgB is the same as the preamble sent in S320. If the preamble identifier in the MsgB is the same as the preamble sent in S420, it is considered that the MsgB is successfully received; otherwise, it is considered that the MsgB fails to be received, and the terminal may re-trigger an RA process.

Optionally, if the MsgB includes a contention resolution identity, after receiving the MsgB, the terminal determines whether the contention resolution identifier in the MsgB matches the RRC message sent in S320 or matches the first 48 bits of the RRC message sent in S320. If the matching is implemented, it indicates that the MsgA is successfully sent.

Before the data transmission method in the embodiments of this application is described, two MAC PDU formats are first described.

Format 1

Figure 6:
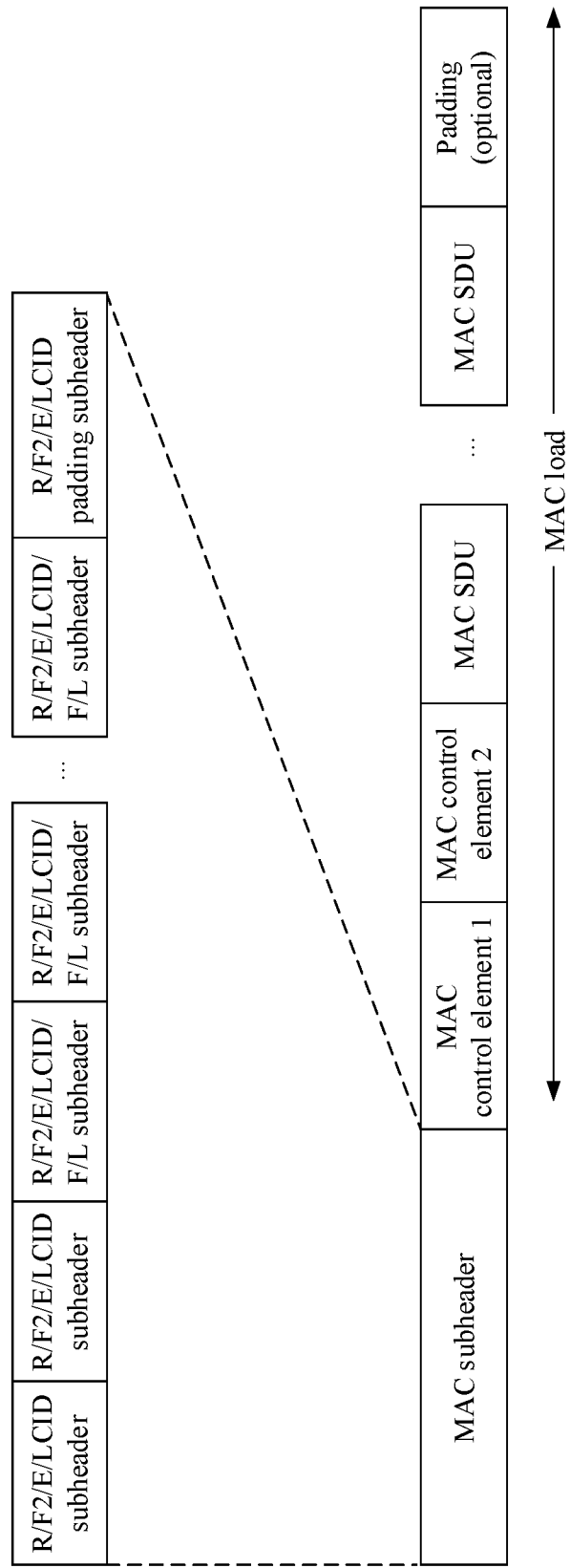
FIG. 6 is a schematic diagram of a format of a MAC PDU.

FIG. 6 shows a format of a MAC PDU. As shown in FIG. 6, the MAC PDU may include two parts: a MAC subheader and a MAC payload. The MAC payload may be a media access control service data unit (MAC SDU), a media access control control element (MAC CE), or padding.

Format 2

Figure 7:
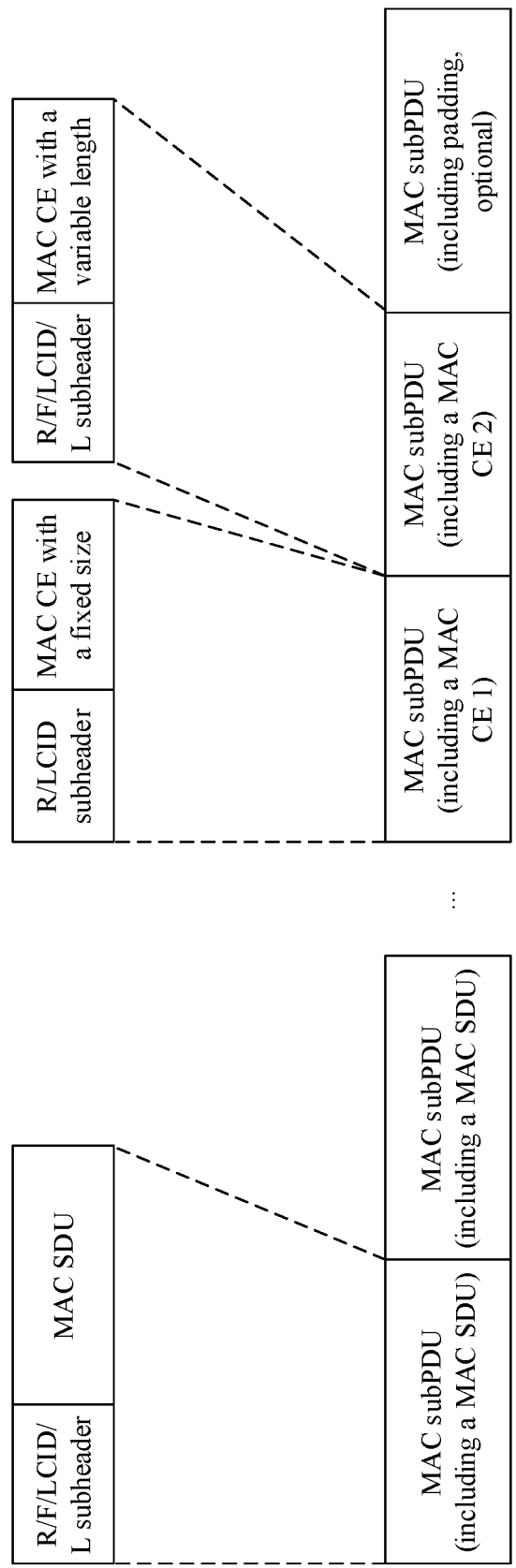
FIG. 7 is a schematic diagram of another format of a MAC PDU.

FIG. 7 shows another format of a MAC PDU. As shown in FIG. 7, the MAC PDU may include one or more media access control sub-protocol data units (MAC subPDU), where the MAC subPDU may include a MAC subheader, and may further include a MAC payload. The MAC payload may be a MAC SDU, a MAC CE, or padding. The MAC SDU, the MAC CE, or the padding is distributed in forms of MAC subPDU in the MAC PDU through interleaving.

Before the embodiments of this application are described, several states of the terminal in the embodiments of this application are first described. In an existing wireless communication system, a plurality of communication states are defined for the terminal. For example, if the terminal establishes a communication connection to the network device, the terminal is defined to be in a connected state. If the terminal is in a standby state, the terminal is defined to be in an idle state. In addition, an inactive state is further defined in a 5G communication system. In the inactive state, the terminal may retain some context information of a communication connection to the network device. In the connected state, the terminal can continuously communicate with the network device.

The following describes the data transmission method provided in the embodiments of this application.

Figure 8:
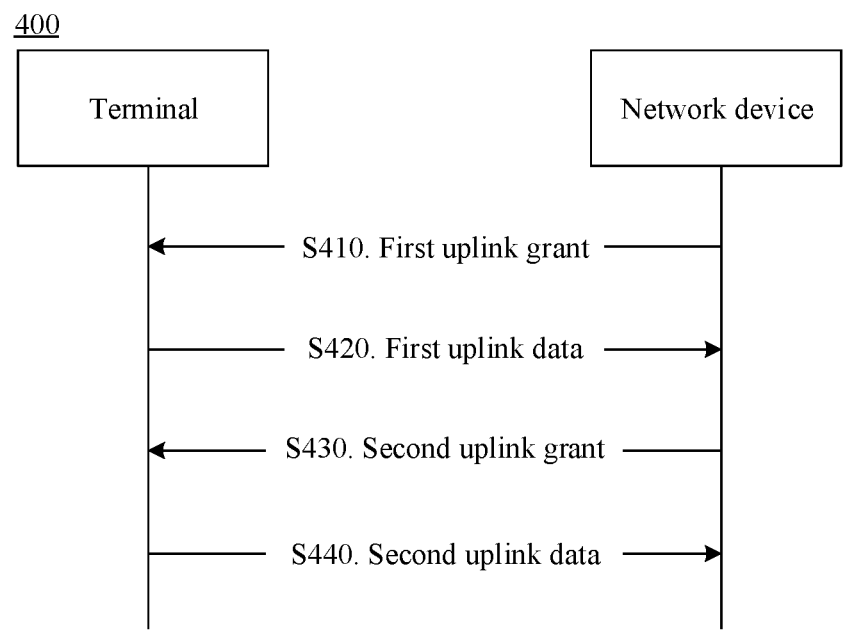
FIG. 8 is a schematic flowchart of a data transmission method according to an embodiment of this application.

FIG. 8 is a schematic flowchart of a data transmission method 400 according to an embodiment of this application. As shown in FIG. 8, the method 400 may be performed by a data transmission apparatus. (for example, a terminal, a chip or apparatus used for the terminal, a network device, or a chip or apparatus used for the network device). An example in which a terminal and a network device perform the method is used for description below. The method 400 includes the following steps S410 to S440.

S410. The network device sends a first uplink grant to the terminal, and the terminal receives the first uplink grant from the network device.

Optionally, the first uplink grant may be carried in an RRC broadcast message and sent by the network device to the terminal, or the first uplink grant may be configured for the terminal in a protocol pre-configuration manner.

Optionally, the first uplink grant may alternatively be carried in RRC dedicated signaling and sent by the network device to the terminal. The RRC dedicated signaling may be an RRC release message, an RRC reconfiguration message, an RRC resume message, or an RRC reestablishment message.

For example, when the terminal switches from a connected state to an idle state or an inactive state, the network device may configure the first uplink grant for the terminal by using the RRC dedicated signaling.

Optionally, the RRC dedicated signaling may further carry valid duration of the first uplink grant, and the first uplink grant is available within the valid duration.

For example, the terminal may send uplink data by using the first uplink grant within the valid duration starting from receiving the RRC dedicated signaling.

S420. The terminal in a first state sends first uplink data in to-be-sent data to the network device by using the first uplink grant, and the network device receives the first uplink data from the terminal.

Optionally, the first state includes the idle state or the inactive state.

Optionally, that the terminal sends first uplink data in to-be-sent data to the network device includes: The terminal sends the first uplink data to the network device when a preset condition is met, where the preset condition includes one or more of the following:

Preset condition 1: The terminal determines that the to-be-sent data exists.

As long as the terminal determines that the to-be-sent data needs to be sent to the network device, the terminal may trigger a data transmission process in S420 to S440.

Preset condition 2: The terminal determines that a data volume of the to-be-sent data is less than or equal to a first preset threshold.

Optionally, the first preset threshold may be sent by the network device to the terminal by using an air interface message, or the terminal may learn of the first preset threshold in a protocol pre-configuration manner.

Optionally, the first preset threshold may be notified to the terminal by using an RRC message, such as a system message or RRC dedicated signaling. The RRC dedicated signaling may be an RRC release message, an RRC reconfiguration message, an RRC resume message, or an RRC reestablishment message.

Optionally, the first preset threshold may be represented by using a transport block size (TBS) threshold, a quantity of protocol data units (PDU), or a quantity of service data units (SDU).

Preset condition 3: The network device indicates that the terminal can trigger the data transmission process.

For example, when the network device indicates that the terminal can trigger the data transmission process, the data transmission process in S420 to S440 may be triggered.

Optionally, the network device may notify the terminal by using an RRC message. For example, the indication may be carried in a system message or RRC dedicated signaling, and the RRC dedicated signaling may be an RRC release message, an RRC reconfiguration message, an RRC resume message, or an RRC reestablishment message.

In an embodiment, the network device may indicate that when the data volume (for example, an uplink to-be-sent data volume) of the to-be-sent data of the terminal is greater than or equal to a second preset threshold, the terminal may transmit data by using the data transmission process. Alternatively, the network device may indicate that when the data volume (for example, an uplink to-be-sent data volume) of the to-be-sent data of the terminal is less than or equal to a second preset threshold, the terminal may transmit data by using the data transmission process. In this case, after receiving the indication, the terminal may determine a relationship between the data volume of the to-be-sent data and the second preset threshold, to determine whether data transmission can be performed by using the data transmission process.

It should be understood that the first preset threshold and the second preset threshold may be the same or may be different.

In another embodiment, the network device may indicate whether the terminal can transmit data by using the data transmission process.

For example, when the network device indicates that the terminal can transmit data by using the data transmission process, the terminal may transmit data by using the data transmission process.

Preset condition 4: The terminal determines that the to-be-sent data is a service data unit SDU, for example, a PDCP SDU.

In an embodiment, when the to-be-sent data of the terminal is a packet data convergence protocol service data unit PDCP SDU or a radio link control service data unit RLC SDU, the terminal may trigger the data transmission process. That is, in S420, if the PDCP SDU or the RLC SDU cannot be completely sent by using the first uplink grant, for example, due to a message size limitation, the terminal cannot send the complete PDCP SDU or RLC SDU by using the first uplink grant, and a remaining part of the PDCP SDU or the RLC SDU may be sent by using the second uplink grant in S440 through segmentation. In this case, the data transmission process may also be triggered.

In this embodiment of this application, when determining that one or more of the foregoing preset conditions are met, the terminal may trigger the process in S420 to S440.

According to the data transmission method in this embodiment of this application, the terminal may send uplink data in the first state after determining that the preset condition is met. Compared with a case in which the terminal sends data to the network device after entering the connected state, this application helps reduce a quantity of times of air interface interaction and a data transmission latency.

It should be understood that the preset condition 1 to the preset condition 4 are merely examples, and there may be another preset condition. This is not limited in this embodiment of this application.

For example, when the terminal determines that the to-be-sent data exists, the terminal may send the first uplink data to the network device by using the first uplink grant.

Alternatively, when the terminal determines that the to-be-sent data is less than or equal to the first preset threshold, the terminal may send the first uplink data to the network device by using the first uplink grant.

Alternatively, after the terminal receives indication information that is used by the network device to indicate that the terminal can trigger the data transmission process, the terminal may send the first uplink data to the network device by using the first uplink grant.

Alternatively, the terminal determines that the to-be-sent data is a service data unit SDU, for example, a PDCP SDU, and the terminal may send the first uplink data to the network device by using the first uplink grant.

For example, when the terminal determines that the to-be-sent data exists and the terminal receives the indication information that is used by the network device to indicate that the terminal can trigger the data transmission process, the terminal may send the first uplink data to the network device by using the first uplink grant.

For example, when the terminal determines that the to-be-sent data is less than or equal to the first preset threshold and the terminal receives the indication information that is used by the network device to indicate that the terminal can trigger the data transmission process, the terminal may send the first uplink data to the network device by using the first uplink grant.

For example, when the terminal determines that the to-be-sent data is an SDU, for example, a PDCP SDU, and a data volume of the SDU is less than the first preset threshold, and the terminal receives the indication information that is used by the network device to indicate that the terminal can trigger the data transmission process, the terminal may send the first uplink data to the network device by using the first uplink grant.

It should be further understood that if the terminal does not meet any one or more of the foregoing conditions, the terminal may first perform state switching, for example, entering the connected state from the first state, and then the terminal sends the to-be-sent data. Alternatively, the terminal may complete sending of only a part of the to-be-sent data in the first state. For example, the terminal sends a part of data by using the first uplink grant in S420 or sends a part of data by using the second uplink grant in S440.

In an embodiment, that the terminal sends first uplink data in to-be-sent data to the network device includes: The terminal sends a first message to the network device, where the first message includes the first uplink data.

Optionally, the first message may include signaling used to initiate random access.

Optionally, that the terminal sends first uplink data in to-be-sent data to the network device includes: The terminal sends a first message of a random access procedure to the network device, where the first message of the random access procedure includes the first uplink data.

It should be understood that the first message of the random access procedure may be the Msg1 in the foregoing method 200, or may be the MsgA in the foregoing method 300.

Optionally, the first message of the random access procedure further includes signaling. The signaling is used to initiate random access. For example, the signaling may include a random access preamble and a DMRS, and the preamble is used to initiate the random access procedure.

The data transmission method in this embodiment of this application may be applied to the random access procedure. The terminal may include the first uplink data in the first message of random access, and the terminal may send uplink data in the first state for a plurality of times. Compared with a case in which the terminal sends data to the network device after entering the connected state, this application helps reduce a quantity of times of air interface interaction and a data transmission latency.

Optionally, the first message may include only the DMRS and not include the preamble.

It should be understood that, that the first message includes only the DMRS may also be understood as a case in which resource scheduling is preconfigured.

Optionally, if the first message of the random access procedure is the MsgA in the foregoing method 300, the first message of the random access procedure may further include information used for contention resolution, for example, identification information of the terminal. As described in the foregoing method 300, the identification information of the terminal may be one or more of C-RNTI information of the terminal, or a resume identifier (Resume ID) or an inactive identifier (inactive RNTI, I-RNTI) of the terminal.

Optionally, the first message may not include the signaling used to initiate random access.

Optionally, the first message may further include channel status information (CSI), for example, channel quality information (CQI), and is used to indicate a current downlink channel status. The CSI information may alternatively be CSI information of synchronization signal blocks (SSBs) of one or more beams.

Optionally, when one or more of the following preset conditions are met, the terminal may not include the preamble in the first message.

Preset condition 5: A synchronization timer maintained by the terminal is still running.

It should be understood that, that different timers maintained by the terminal are still running may also be understood as that the synchronization timer does not expire.

In an embodiment, the synchronization timer may be configured by the network device for the terminal by using an air interface message, and the synchronization timer may run in the idle state or the inactive state.

Preset condition 6: The terminal does not move to a new cell or a new area.

It should be understood that, that the terminal does not move to a new cell or a new area may also be understood that the terminal still camps on a previous serving cell or area when triggering the data transmission process, and the area may include at least one cell.

Preset condition 7: The terminal determines that the first uplink grant is still valid.

For example, one valid duration or one timer is configured for the first uplink grant. That the terminal determines that the first uplink grant is still valid may be understood as: The terminal determines that the first uplink grant is within the valid duration or that the timer is still running.

Preset condition 8: The terminal detects signal quality of a downlink signal, compares the signal quality with a third preset threshold, and determines that the signal quality of the downlink signal is greater than or equal to the third preset threshold.

In an embodiment, the third preset threshold may be configured by the network device for the terminal by using an air interface message, or may be embodied in a protocol pre-configuration manner.

Preset condition 9: The terminal receives, from the network device, indication information indicating that the terminal does not need to send the signaling.

For example, the indication information may be sent by the network device to the terminal by using an air interface RRC message.

It should be understood that, when the terminal meets one or more of the preset condition 5 to the preset condition 9, the terminal may not include the preamble used to initiate random access in the first message.

Optionally, the method 400 further includes: The terminal sends first indication information to the network device, and the network device receives the first indication information sent by the terminal, where the first indication information is used to indicate that the to-be-sent data is not completely sent.

It should be understood that, that the first indication information is used to indicate that the to-be-sent data is not completely sent may also be understood as: The first indication information is used to indicate that the terminal completes transmission of the to-be-sent data by using the method 400; the terminal expects to complete data sending in the idle state or in the inactive state; the first indication information is used to indicate that the terminal has other uplink data; or the first indication information is used to request the second uplink grant.

In this embodiment of this application, the terminal indicates to the network device that the to-be-sent data is not completely sent, so that the network device may indicate the terminal to continue to remain in the first state to send uplink data. Compared with a case in which the terminal sends data to the network device after entering the connected state, this application helps reduce a quantity of times of air interface interaction and a data transmission latency.

Optionally, the first indication information includes information used to indicate the data volume of the to-be-sent data, for example, a data volume of available data obtained after a MAC PDU is assembled into a packet, and a value of the data volume may be 0.

In this embodiment of this application, the terminal indicates the data volume of the to-be-sent data in the first indication information. This helps the network device determine whether a terminal state needs to be adjusted, and helps reduce a quantity of times of air interface interaction and a data transmission latency. In addition, if the network device determines that the data volume of the to-be-sent data is relatively small (where for example, the network device determines that the terminal can send all of the to-be-sent data by using the second uplink grant), the network device may indicate the terminal to continue to remain in the first state, thereby helping reduce power consumption of the terminal.

It should be understood that, that the first indication information herein includes the information used to indicate the data volume of the to-be-sent data may also be understood as: The first indication information includes information used to indicate a data volume of remaining data in the to-be-sent data; or the first indication information includes information used to indicate a data volume of remaining data in the to-be-sent data except the first uplink data.

Optionally, the first indication information may include one information element, where the information element is used to indicate that the to-be-sent data is not completely sent.

Optionally, the first indication information may include one information element, where the information element is used to indicate the data volume of the to-be-sent data, and the information element may further implicitly indicate that the to-be-sent data is not completely sent.

Optionally, the first indication information may include two information elements, where one information element is used to indicate that the to-be-sent data is not completely sent, and the other information element is used to indicate the data volume of the to-be-sent data.

Optionally, the first indication information may be carried in at least one of the following manners:

Manner 1: RRC Indication

The terminal may include a new cause value in the RRC indication, for example, that the to-be-sent data of the terminal is not completely sent.

Manner 2: BSR Indication

Optionally, the BSR indication may be a short BSR indication, a long BSR indication, or a padding BSR indication.

Optionally, when the to-be-sent data of the terminal is not completely sent or the terminal has other uplink data, that is, after sending the first uplink data in the to-be-sent data, the terminal further needs to send the second uplink data to complete transmission of the to-be-sent data, the terminal may indicate the data volume of the to-be-sent data by using the BSR indication.

Manner 3: Simplified L2 Signaling Indication

Figure 9:
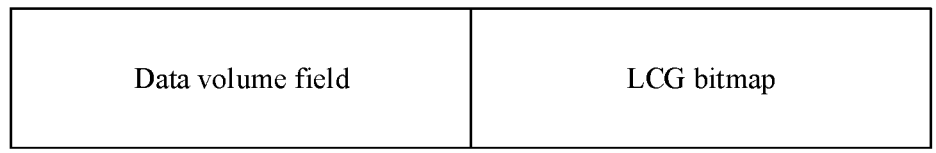
FIG. 9 is a schematic diagram of a MAC CE or a MAC subheader.
Figure 9:
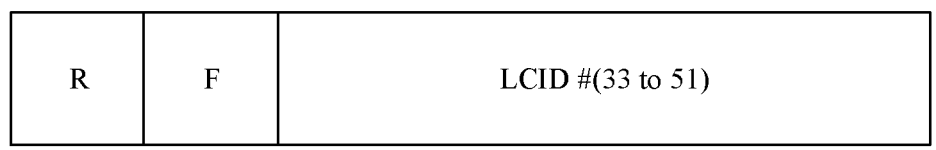

Optionally, the terminal may use a new MAC CE or MAC subheader. FIG. 9 is a schematic diagram of a MAC CE or a MAC subheader. As shown in FIG. 9, the upper part is a new MAC CE, including a data volume field and a logical channel group bitmap (LCG bitmap). The LCG bitmap may be used to indicate which logical channel groups (LCGs) include to-be-sent data. For example, a corresponding bit location may be set to "1"; otherwise, a corresponding bit location may be set to "0". The lower part is a new MAC subheader. The MAC field includes an R field, an F field, and a logical channel identifier (LCID). When the MAC subheader is included, it may indicate that the logical channel (LCH) includes to-be-sent data.

Optionally, a special bit may further be set in an existing PDCP or RLC subheader. For example, when a value of the bit is "1", it indicates that the to-be-sent data of the terminal is not completely sent or the terminal has other uplink data.

Manner 4: L1 Signaling

Optionally, the L1 signaling may be uplink control information (UCI), including but not limited to a physical uplink control channel (PUCCH).

Optionally, the first uplink data and the first indication information may be carried in the first message and sent to the network device.

Optionally, the first message may further include an RRC message, for example, an uplink common control channel (UL CCCH) message, including but not limited to at least one of the following messages: an RRC establishment request, an RRC resume request, an RRC reestablishment request, an RRC system information request, and the like.

Another possibility is that, the first message may not include an RRC message, but may carry some or all information elements (IEs) included in the RRC message, for example, an I-RNTI and a resume cause value. The some or all information elements may be sent by using a MAC layer message, for example, a MAC CE.

S430. The network device sends the second uplink grant to the terminal, and the terminal receives the second uplink grant from the network device.

Optionally, the second uplink grant may be a preconfigured uplink grant.

For example, when the terminal is in the connected state, the network device may configure the second uplink grant for the terminal, and the terminal may not release the second uplink grant when the terminal is in the first state.

For example, the network device may configure the second uplink grant for the terminal by using a system message or RRC dedicated signaling.

For example, the RRC dedicated signaling may be an RRC release message, an RRC reconfiguration message, an RRC resume message, an RRC reestablishment message, or the like. Alternatively, the second uplink grant may be configured for the terminal by using an RRC system message, or may be configured in a protocol pre-configuration manner, and the network device does not need to notify the terminal.

Optionally, that the network device sends the second uplink grant to the terminal includes: The network device sends a second message to the terminal, where the second message includes the second uplink grant.

In this embodiment of this application, the network device may include the second uplink grant in the second message, so that when sending of the to-be-sent data of the terminal cannot be completed in the first message or new data arrives after sending of the to-be-sent data is completed, this part of data can be sent to the network device in a timely manner.

Optionally, the second message may be a second message of the random access procedure.

Optionally, if the second message of the random access procedure is the Msg2 in the method 200, the second message of the random access procedure may include a preamble ID.

Optionally, if the second message of the random access procedure is the MsgB in the method 300, the second message of the random access procedure may include contention resolution information in addition to a preamble ID. For example, the contention resolution information may be a contention resolution identity. If the contention resolution identifier matches the RRC message sent by the terminal in the first message (MsgA) of the random access procedure, the MAC layer message sent by the terminal in the first message (MsgA) of the random access procedure, or the first 48 bits of the RRC message sent by the terminal in the first message (MsgA) of the random access procedure or the MAC layer message sent by the terminal in the first message (MsgA) of the random access procedure, the terminal considers that contention resolution is successful.

The data transmission method in this embodiment of this application may be applied to the random access procedure. The network device may include the second uplink grant in the second message of the random access procedure, and the second uplink grant is used by the terminal to newly transmit data. The terminal may continue to send uplink data in the first state. This helps reduce a quantity of times of air interface interaction and a data transmission latency.

Optionally, the second message may further carry an RRC message, for example, a downlink dedicated control channel (DL DCCH) message, including but not limited to at least one of the following messages: an RRC reconfiguration message, an RRC resume message, an RRC release message, an RRC reestablishment message, downlink information transmission, and the like.

Another possibility is that, the second message may not include an RRC message, but may carry some or all information elements included in the RRC message, The some or all information elements may be sent by using MAC layer signaling, for example, a MAC CE.

Optionally, the second message may further carry a contention resolution identity MAC CE, used to indicate whether the terminal successfully resolves a conflict.

Optionally, the second message may further carry downlink data. The downlink data and the RRC message may be multiplexed into a same MAC PDU, or may not be multiplexed into a same MAC PDU, that is, the downlink data and the RRC message are sent to the terminal by using two messages, where one message is used to send the RRC message, and the other message is used to send the downlink data. Alternatively, the downlink data may be sent to the terminal by using a plurality of downlink messages.

Optionally, the method further includes: The network device sends second indication information to the terminal, and the terminal receives the second indication information from the network device, where the second indication information is used to indicate that the terminal remains in the first state.

In this embodiment of this application, after receiving the first uplink data, the network device may indicate the terminal to continue to remain in the first state. This helps reduce power consumption of the terminal.

In an embodiment, if the first indication information may indicate the data volume of the to-be-sent data in S410, the network device may determine, based on the data volume, to indicate the terminal to remain in the first state or indicate the terminal to switch to the connected state, to send the second indication information to the terminal.

For example, if the network device determines that the terminal can send all remaining data in the to-be-sent data once by using the second uplink data, the network device may send the second indication information to the terminal, where the second indication information is used to indicate that the terminal remains in the first state.

Optionally, the network device may alternatively implicitly indicate, by using another information element in the second message, the terminal to remain in the first state.

For example, when the terminal receives the second uplink grant sent by the network device, the terminal may implicitly learn, by using the second uplink grant, that the network device expects the terminal to remain in the first state.

Optionally, the second indication information may be carried in an RRC message, for example, an RRC release message, an RRC resume message, or an RRC reconfiguration message.

In this embodiment of this application, the network device may indicate the terminal to continue to remain in the idle state or the inactive state, to prevent the terminal from entering the connected state to perform data transmission, thereby helping to reduce power consumption of the terminal.

S440. When the terminal is in the first state, the terminal sends the second uplink data to the network device by using the second uplink grant.

Optionally, the second uplink data may be at least a part of uplink data in the to-be-sent data except the first uplink data.

Optionally, the second uplink data may be uplink data newly arrived after the terminal sends the first uplink data.

Optionally, the second uplink data may alternatively be uplink data in the to-be-sent data except the first uplink data and newly arrived uplink data.

Optionally, that the terminal sends the second uplink data to the network device includes: The terminal sends a third message to the network device, where the third message includes the second uplink data.

Optionally, the third message may be the first message of the random access procedure.

In an embodiment, if the second message carries the second uplink grant, the terminal may send the second uplink data by using the second uplink grant.

In an embodiment, if the second message does not carry the second uplink grant, or an uplink grant carried in the second message cannot be used to transmit new data, the terminal may send the second uplink data by using the second uplink grant dynamically scheduled by the network device. For example, the network device may schedule an uplink grant resource by using downlink control information (DCI) scrambled by a terminal identifier.

Optionally, the method 400 includes: The terminal receives the second message from the network device, where the second message includes a third uplink grant, and the third uplink grant is used to retransmit the first uplink data; and the terminal retransmits the first uplink data to the network device by using the third uplink grant.

In this embodiment of this application, the second message may carry the second uplink grant used by the terminal to send the second uplink data or used by the terminal to send new data. Alternatively, the second message may carry the third uplink grant used for retransmission of the first uplink data. When the third uplink grant carried in the second message is used for retransmission of the first uplink data, the terminal may send the second uplink data by using the second uplink grant dynamically scheduled by the network device.

It should be understood that if the second message carries the third uplink grant instead of the second uplink grant, the terminal may implicitly learn that the first uplink data is not successfully sent and needs to be retransmitted.

In an embodiment, if the terminal still has other uplink data that needs to be sent after the terminal completes sending of the second uplink data by using the second uplink grant, the terminal may continue to indicate to the network device that the to-be-sent data is not completely sent. In this case, the network device may continue to deliver an uplink grant to the terminal, so that the terminal continues to send the uplink data.

Optionally, the network device may send the second message to the terminal for a plurality of times, and the second message may carry a new uplink grant used to transmit new data. Therefore, the terminal may send uplink data to the network device for a plurality of times by using a plurality of uplink grants carried in a plurality of second messages.

Optionally, the terminal may send uplink data to the network device for a plurality of times by using a plurality of preconfigured uplink grants.

According to the data transmission method in this embodiment of this application, the terminal may send uplink data to the network device for a plurality of times when the terminal is in the idle state or in the inactive state. Compared with a case in which the terminal sends data to the network device after entering a connected state, this application helps reduce a quantity of times of air interface interaction and a data transmission latency.

Optionally, the method 400 further includes: The terminal sends third indication information to the network device, where the third indication information is used to indicate that sending of the to-be-sent data is completed; and the terminal receives fourth indication information from the network device, where the fourth indication information is used to indicate the terminal to remain in the first state.

It should be understood that the second indication information may be the same as the fourth indication information.

It should be further understood that, that the third indication information is used to indicate that sending of the to-be-sent data is completed may also be understood as: The third indication information is used to indicate that the terminal does not have other uplink data and/or downlink data; the third indication information is used to indicate that the terminal sends the to-be-sent data in the first state, and does not need to switch to the connected state to send the to-be-sent data; or the third indication information is used to indicate that sending of the to-be-sent data and the uplink data that is newly arrived after the first uplink data is sent is completed.

In an embodiment, the third indication information may be a BSR, and a data volume in a buffer status in the BSR is set to 0.

In another embodiment, the terminal may not send the third indication information to the network device. If the network device does not receive the third indication information, the network device may learn that the terminal does not have other uplink data.

It should be further understood that, for an indication manner of the third indication information, refer to the indication manner of the first indication information. For brevity, details are not described herein again.

After sending of the to-be-sent data of the terminal is completed, the terminal may send the third indication information to the network device. After receiving the third indication information, the network device may determine that sending of the to-be-sent data of the terminal is completed, and may further send the fourth indication information to the terminal. After receiving the fourth indication information, the terminal continues to remain in the idle state or the inactive state.

In this embodiment of this application, after sending of the to-be-sent data of the terminal is completed, the terminal may indicate to the network device that there is no other uplink data, and the network device may indicate the terminal to continue to remain in the idle state or the inactive state. This helps reduce power consumption of the terminal.

Optionally, the method 400 further includes: The network device receives fifth indication information, where the fifth indication information is used to indicate that there is no downlink data of the terminal; and the network device sends the fourth indication information to the terminal based on the third indication information and the fifth indication information.

Optionally, the fifth indication information is used to indicate whether there is downlink data of the terminal, a value of the fifth indication information is a first value, and the first value is used to indicate that there is no downlink data of the terminal.

Optionally, before sending the fourth indication information to the terminal, the network device may receive the fifth indication information sent by another network device (for example, a core network device). The fifth indication information may be used to indicate that there is no downlink data of the terminal. In this case, if the network device determines, by using the third indication information, that the terminal does not have other uplink data, and determines, by using the fifth indication information, that there is no other downlink data of the terminal, the network device may send the fourth indication information to the terminal.

Optionally, the fifth indication information may be one or more of the following indication information:

(1) terminal granularity indication information, used to indicate that there is no other downlink data of the terminal;

(2) session granularity indication information, used to indicate that there is no other downlink data for a session of the terminal;

(3) flow granularity indication information, used to indicate that there is no other downlink data for a quality of service (QoS) flow of the terminal; and (4) bearer granularity indication information, used to indicate that there is no other downlink data for a bearer of the terminal.

Figure 10:
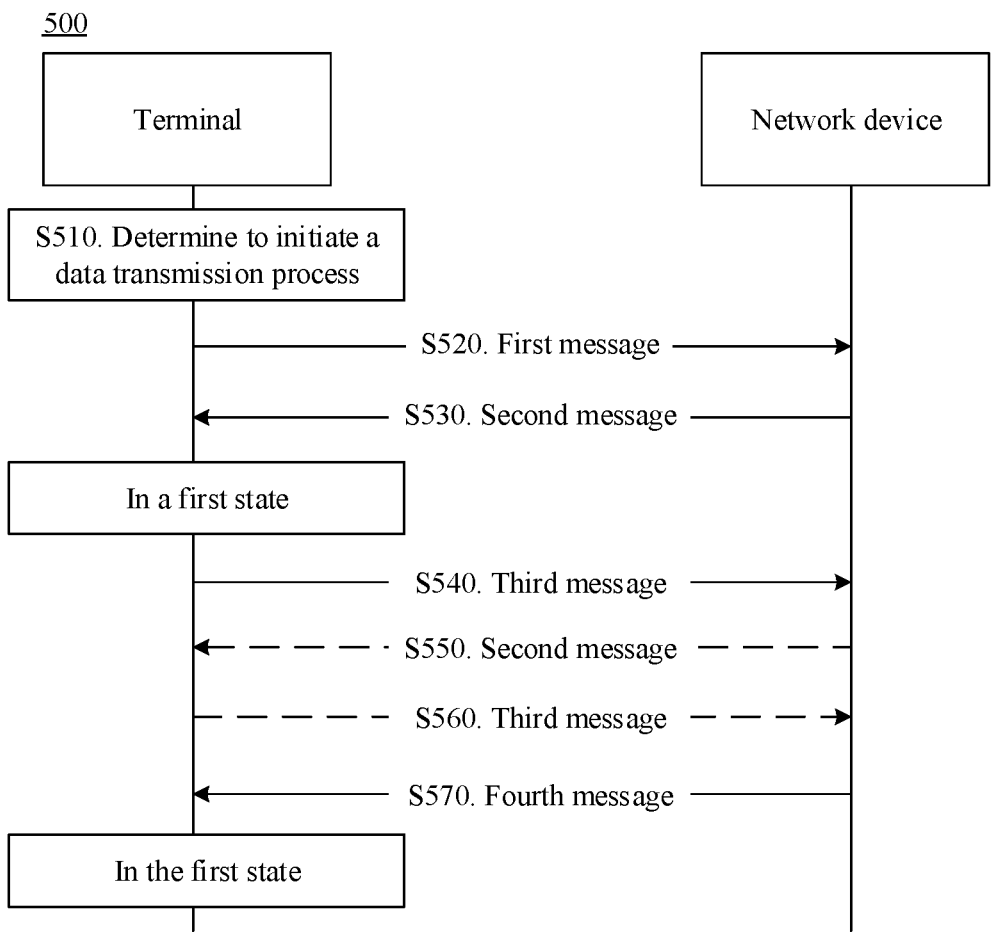
FIG. 10 is another schematic flowchart of a data transmission method according to an embodiment of this application.

FIG. 10 is a schematic flowchart of a data transmission method 500 according to an embodiment of this application. As shown in FIG. 10, the method 500 includes the following steps S510 to S570.

S510. A terminal determines to initiate a data transmission process.

It should be understood that, when one or more of the preset condition 1 to the preset condition 4 are met, the terminal may determine to initiate the data transmission process. For the preset condition 1 to the preset condition 4, refer to the descriptions in the foregoing method 400. For brevity, details are not described herein again.

S520. When the terminal is in a first state, the terminal sends a first message to a network device, and the network device receives the first message sent by the terminal, where the first message includes first uplink data and first indication information, the first indication information is used to indicate that the terminal has other uplink data, and the first state is an idle state or an inactive state.

Optionally, the terminal sends the first message to the network device by using a first uplink grant.

It should be understood that, for a manner of obtaining the first uplink grant, refer to the descriptions in the foregoing method 400. For brevity, details are not described herein again.

It should be further understood that, for an indication manner of the first indication information, refer to the descriptions in the foregoing method 400. For brevity, details are not described herein again.

Optionally, the first message may be a first message of random access.

It should be understood that, for descriptions of the first message of random access, refer to the descriptions in the foregoing method 400. For brevity, details are not described herein again.

S530. The network device sends a second message to the terminal, and the terminal receives the second message sent by the network device, where the second message includes a second uplink grant, and the second uplink grant is used by the terminal to send new data.

Optionally, the second message may be a second message of the random access procedure.

It should be understood that, for descriptions of the second message of the random access procedure, refer to the descriptions in the foregoing method 400. For brevity, details are not described herein again.

Optionally, the second message may further carry downlink data.

Optionally, the second message may further carry second indication information, and the second indication information is used to indicate the terminal to remain in the first state.

It should be understood that, for an indication manner of the second indication information, refer to the descriptions in the foregoing method 400. For brevity, details are not described herein again.

S540. The terminal sends a third message to the network device by using the second uplink grant, where the third message includes second uplink data and third indication information, and the third indication information is used to indicate that the terminal does not have other uplink data.

Optionally, the second uplink data may be uplink data remained after the terminal completes sending of the first uplink data, or may be uplink data newly arrived after the terminal completes sending of the first uplink data.

Optionally, for an indication manner of the third indication information, refer to the descriptions in the foregoing method 400. For brevity, details are not described herein again.

Optionally, if the third indication information indicates that the terminal has other uplink data, the method 500 further includes the following steps.

S550. The terminal receives a second message sent by the network device, where the second message includes a fourth uplink grant, and the second uplink grant is used by the terminal to send new data.

S560. The terminal sends a third message to the network device by using the fourth uplink grant, where the third message includes third uplink data.

Optionally, in S560, the terminal may alternatively include, in the third message, indication information indicating whether the terminal has other uplink data. If the terminal indicates that there is other uplink data in S560, the network device may continue to include a new uplink grant in the second message, so that the terminal continues to send the uplink data. If the terminal does not have other uplink data in S560, the network device may send a fourth message to the terminal.

S570. The network device sends the fourth message to the terminal.

Optionally, the fourth message may carry fourth indication information.

Optionally, the fourth message may further carry downlink data.

It should be understood that, for descriptions of the fourth indication information, refer to the descriptions in the foregoing method 400. For brevity, details are not described herein again.

Optionally, the fourth message may be an acknowledgment message for the third message.

For example, the fourth message may be L1 signaling, for example, DCI, and is used to indicate that the third message is successfully received.

For another example, the fourth message may alternatively be an RRC release message, and the RRC release message may be used to indicate the terminal to continue to remain in the first state.

Optionally, the RRC release message may further carry a new I-RNTI, a paging period, and a next hop chaining count (NCC), to update a key.

Optionally, before the network device sends the fourth message to the terminal, the method 500 further includes: The network device receives fifth indication information sent by another network device, where the fifth indication information is used to indicate that there is no downlink data of the terminal.

That the network device sends fourth indication information to the terminal includes: The network device sends the fifth indication information to the terminal based on the third indication information and the fourth indication information.

For example, when the network device determines, by using the third indication information, that the terminal does not have other uplink data, and determines, by using the fifth indication information, that there is no other downlink data of the terminal, the network device may send the fourth indication information to the terminal.

It should be understood that, for descriptions of the fifth indication information, refer to the descriptions in the foregoing method 400. For brevity, details are not described herein again.

According to the data transmission method in this embodiment of this application, the terminal may send uplink data by using the first message and one or more third messages, and may complete sending of the uplink data in the idle state or the inactive state. This prevents the terminal from entering a connected state to send the uplink data, thereby reducing signaling overheads. In addition, the network device indicates the terminal to remain in the idle state or the inactive state, which helps reduce power consumption of the terminal.

Figure 11:
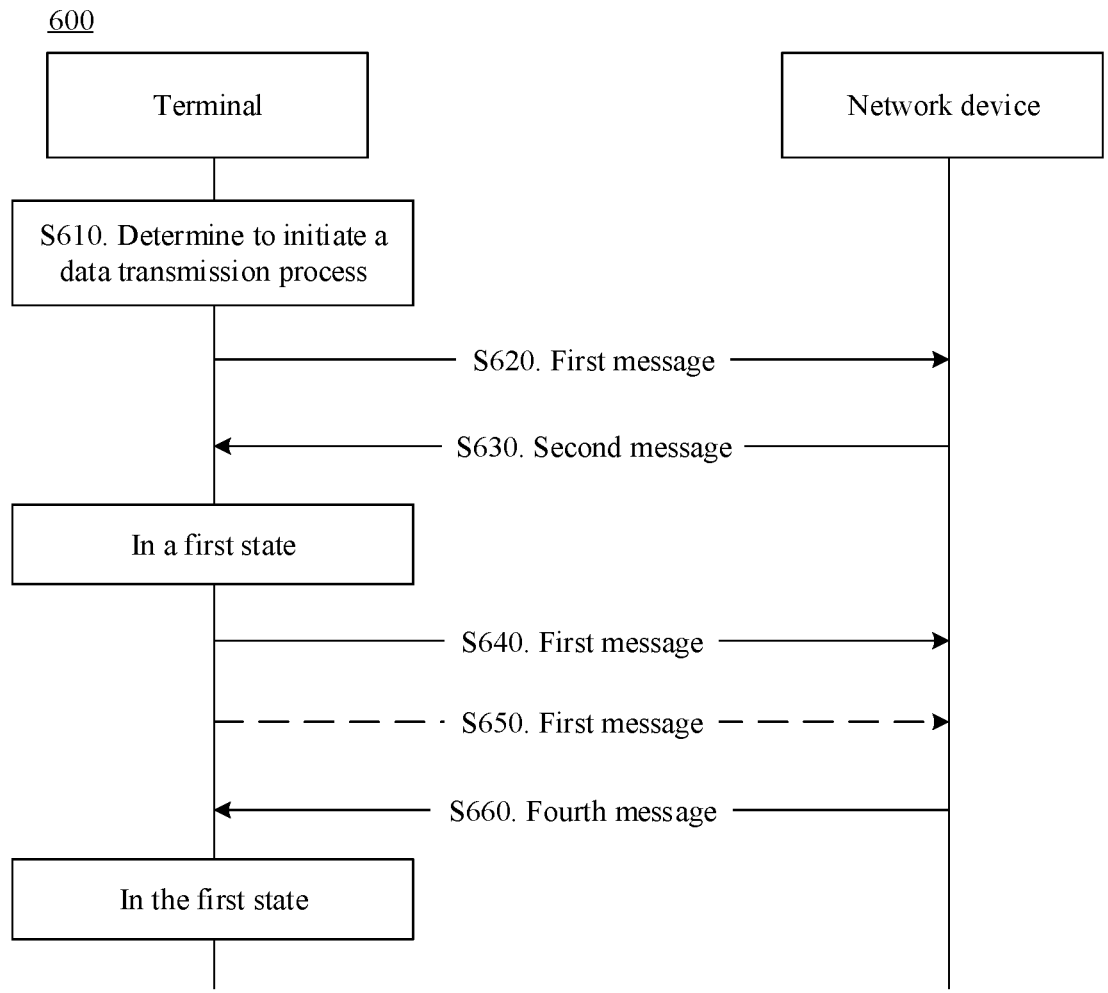
FIG. 11 is another schematic flowchart of a data transmission method according to an embodiment of this application.

FIG. 11 is a schematic flowchart of a data transmission method 600 according to an embodiment of this application. As shown in FIG. 11, the method 600 includes the following steps S610 to S660.

S610. A terminal determines to initiate a data transmission process.

S620. When the terminal is in a first state, the terminal sends a first message to a network device, and the network device receives the first message sent by the terminal, where the first message includes first uplink data and first indication information, the first indication information is used to indicate that the terminal has other uplink data, and the first state is an idle state or an inactive state.

In an embodiment, when the terminal is in the first state, the terminal sends the first message to the network device, and the network device receives the first message sent by the terminal, where the first message includes the first uplink data and third indication information, and the third indication information is used to indicate that the terminal does not have other uplink data. After receiving the first message, the network device may learn that the terminal does not expect to switch from the first state to a connected state, and the terminal in the first state may send the first message to the network device for a plurality of times, where the first message carries uplink data. For example, the third indication information may be a BSR, and a data volume in a buffer status in the BSR is set to 0. Optionally, each time after receiving the first message, the network device may send a fourth message to the terminal.

It should be understood that the terminal may have other to-be-sent data when sending the first uplink data. However, because the terminal does not expect the network device to indicate the terminal to switch to the connected state, the terminal may include the third indication information in the first message. After receiving the third indication information, the network device may determine that the terminal does not have other uplink data (where actually, the terminal may have other uplink data), so that the terminal continues to remain in the first state, and the terminal may continue to send the to-be-sent data to the network device when the terminal is in the first state.

In an embodiment, the terminal may include the first uplink data and third indication information in the first message, and the third indication information is used to indicate that the terminal does not have other uplink data. At a moment, after receiving uplink data and the third indication information by using the first message, and receiving fifth indication information sent by another network device, the network device may send the fourth message to the terminal.

It should be understood that for S610 and S620, refer to the foregoing processes of S510 and S520. For brevity, details are not described herein again.

S630. The network device sends a second message to the terminal.

Optionally, the second message carries a third uplink grant, and the third uplink grant is used for data retransmission.

Optionally, the second message carries a third uplink grant, and the third uplink grant may be used to transmit the first uplink data, that is, may be used to retransmit the first uplink data.

In an embodiment, when the third uplink grant is used to retransmit the first uplink data, the terminal may determine that the first uplink data is not successfully sent. When receiving the third uplink grant, the terminal may implicitly learn that the first uplink data is not successfully sent. Alternatively, in addition to carrying the third uplink grant, the second message may further carry indication information used to indicate that the first uplink data is not successfully sent.

Optionally, the second message may further carry an RRC message. For a specific type of the carried RRC message, refer to the descriptions in the foregoing method 400. For brevity, details are not described herein again.

Optionally, the second message may further carry second indication information, and the second indication information is used to indicate the terminal to remain in the first state.

It should be understood that, for descriptions of the second indication information, refer to the descriptions in the foregoing method 400. For brevity, details are not described herein again.

Optionally, the second message may further carry a contention resolution identity MAC CE, used to indicate whether the terminal successfully resolves a conflict.

Optionally, the second message may further carry downlink data.

S640. The terminal sends a first message to the network device, where the first message carries second uplink data.

Optionally, the terminal sends the first message to the network device by using a second uplink grant.

Optionally, the second uplink grant may be a preconfigured uplink grant.

Optionally, the first message may further carry the third indication information, and the third indication information is used to indicate that the terminal does not have other uplink data.

Optionally, the second uplink data may be uplink data remained after the terminal completes sending of the first uplink data, or may be uplink data newly arrived after the terminal completes sending of the first uplink data.

Optionally, for an indication manner of the third indication information, refer to the descriptions in the foregoing method 400. For brevity, details are not described herein again.

In an embodiment, if the third indication information indicates that the terminal has other uplink data, the method 600 further includes the following steps.

S650. The terminal sends a first message to the network device, where the first message carries third uplink data.

S660. The network device sends the fourth message to the terminal.

Optionally, after the network device receives the third indication information used to indicate that the terminal does not have other uplink data, the network device may send the fourth message to the terminal.

It should be understood that, for descriptions of the fourth message, refer to the descriptions in the foregoing method 500. For brevity, details are not described herein again.

It should be further understood that, before sending the fourth message to the terminal, the network device may further receive the fifth indication information, and the network device may send the fourth indication information to the terminal based on the third indication information and the fifth indication information. For a specific process, refer to the descriptions in the foregoing method 500. For brevity, details are not described herein again.

It should be further understood that the network device may not send the fourth message to the terminal each time after receiving the third indication information by using the first message, but sends the fourth message to the terminal after the network device receives the fifth indication information.

According to the data transmission method in this embodiment of this application, the terminal may send uplink data by using one or more first messages, and may complete sending of the uplink data in the idle state or the inactive state. This prevents the terminal from entering a connected state to send the uplink data, thereby reducing signaling overheads. In addition, the network device indicates the terminal to remain in the idle state or the inactive state, which helps reduce power consumption of the terminal.

With reference to FIG. 8 to FIG. 11, the foregoing describes the case in which the terminal can complete sending the uplink data in the idle state or the inactive state. The following describes another data transmission method according to the embodiments of this application with reference to FIG. 12 to FIG. 14.

Figure 12:
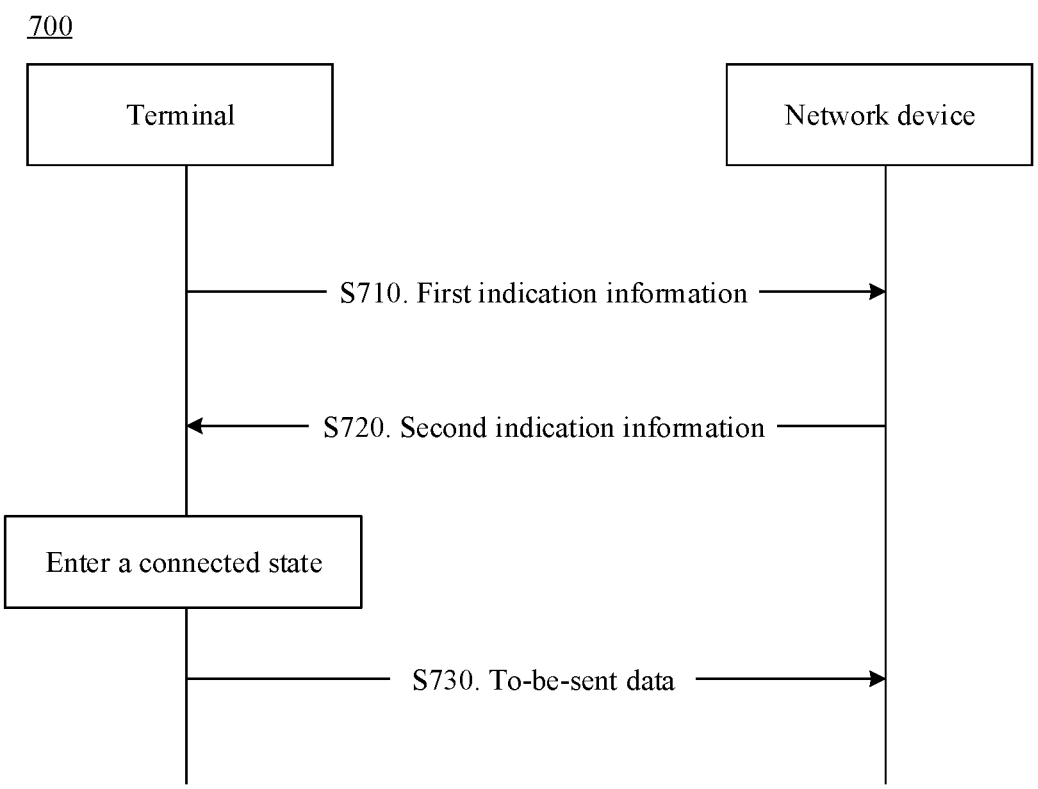
FIG. 12 is another schematic flowchart of a data transmission method according to an embodiment of this application.

FIG. 12 is a schematic flowchart of another data transmission method 700 according to an embodiment of this application. As shown in FIG. 12, the method 700 includes the following steps S710 to S730.

S710. A terminal in a first state sends first indication information to a network device, where the first indication information is used to indicate that the terminal has to-be-sent data, and the first state includes an idle state or an inactive state.

Optionally, that a terminal in a first state sends first indication information to a network device includes: The terminal sends a first message to the network device, where the first message includes the first indication information.

Optionally, the first message is a first message of a random access procedure.

It should be understood that, for an indication manner of the first indication information, refer to the descriptions in the foregoing method 400. For brevity, details are not described herein again.

It should be further understood that, for descriptions of the first message of the random access procedure, refer to the descriptions in the foregoing method 400. For brevity, details are not described herein again.

Optionally, the method 700 further includes: The terminal receives a first uplink grant from the network device; and the terminal in the first state sends first uplink data to the network device by using the first uplink grant, where the first indication information is used to indicate that in addition to the first uplink data, the terminal has other uplink data.

It should be understood that, in the method 700, the terminal in the first state may send a part of the to-be-sent data, or may not send uplink data.

It should be further understood that the terminal may determine, based on one or more of the preset condition 1 to the preset condition 4 in the method 400, whether to send the first uplink data in the first state. For a specific process, refer to the descriptions in the foregoing method 400. For brevity, details are not described herein again.

S720. The network device sends second indication information to the terminal, where the second indication information is used to indicate the terminal to switch from the first state to a connected state.

Optionally, that the network device sends second indication information to the terminal includes: The network device sends a second message to the terminal, where the second message carries the second indication information.

Optionally, the second message may be a second message of the random access procedure.

It should be understood that, for descriptions of the second message of the random access procedure, refer to the descriptions in the foregoing method 400. For brevity, details are not described herein again.

Optionally, the second message may not include the second indication information.

For example, after the terminal receives the second message, if the second message includes a contention resolution identity, the terminal may implicitly learn that the network device expects the network device to switch from the first state to the connected state.

S730. The terminal in the connected state sends the to-be-sent data to the network device.

It should be understood that for a process in which the terminal in the connected state sends the to-be-sent data to the network device, refer to a conventional technology. This is not limited in this embodiment of this application.

Optionally, the method 700 further includes: The terminal sends third indication information to the network device, where the third indication information is used to indicate that sending of the to-be-sent data is completed; and the terminal receives fourth indication information from the network device, where the fourth indication information is used to indicate the terminal to switch to the first state.

Optionally, before the network device sends the fourth indication information, the method further includes: The network device receives fifth indication information.

It should be understood that, for the fifth indication information, refer to the descriptions in the foregoing method 400. For brevity, details are not described herein again.

Figure 13:
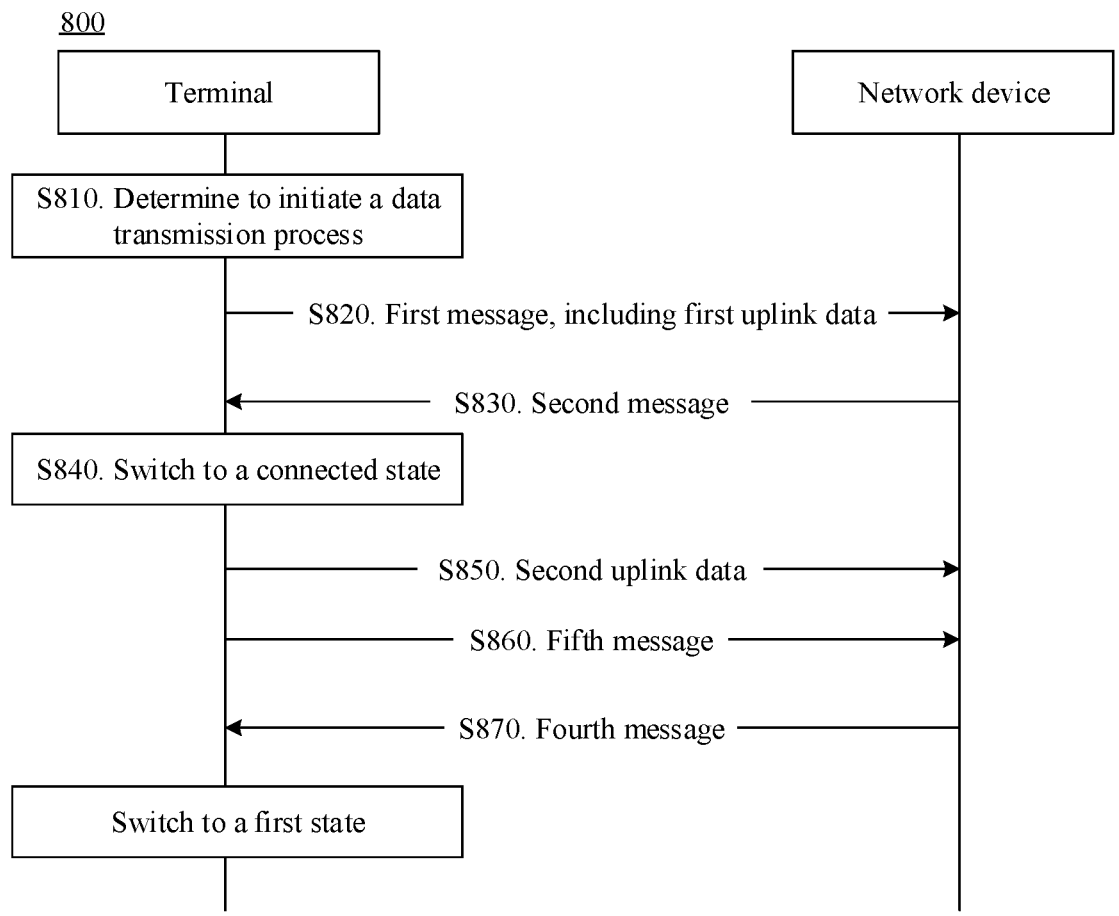
FIG. 13 is another schematic flowchart of a data transmission method according to an embodiment of this application.

FIG. 13 is a schematic flowchart of a data transmission method 800 according to an embodiment of this application. As shown in FIG. 13, the method 800 includes the following steps S810 to S870.

S810. A terminal determines to initiate a data transmission process.

S820. When the terminal is in a first state, the terminal sends a first message to a network device, and the network device receives the first message sent by the terminal, where the first message includes first uplink data, and the first state is an idle state or an inactive state.

Optionally, the first message further includes first indication information, and the first indication information is used to indicate that the terminal has other uplink data.

It should be understood that for S810 and S820, refer to the foregoing processes of S510 and S520. For brevity, details are not described herein again.

S830. The network device sends a second message to the terminal.

Optionally, the second message includes second indication information, and the second indication information is used to indicate the terminal to switch to a connected state.

It should be understood that, for descriptions of the second indication information, refer to the descriptions in the foregoing method 700. For brevity, details are not described herein again.

S840. The terminal switches from the first state to the connected state.

S850. The terminal in the connected state sends to-be-second uplink data to the network device.

Optionally, the second uplink data may be uplink data remained after the terminal completes sending of the first uplink data, or may be uplink data newly arrived after the terminal completes sending of the first uplink data.

Optionally, the method further includes the following steps.

S860. The terminal sends a fifth message to the network device, where the fifth message is used to indicate that an RRC resume process is completed or RRC establishment is completed.

For example, the fifth message is an RRC resume complete message or an RRC establishment complete message.

It should be understood that there is no actual sequence between S850 and S860.

S870. The network device sends a fourth message to the terminal.

It should be understood that, for descriptions of the fourth message, refer to the descriptions in the foregoing method 500. For brevity, details are not described herein again.

It should be further understood that, before sending the fourth message to the terminal, the network device may further receive the fifth indication information, and the network device may send the fourth indication information to the terminal based on the third indication information and the fifth indication information. For a specific process, refer to the descriptions in the foregoing method 500. For brevity, details are not described herein again.

In this embodiment of this application, the terminal may send uplink data for a plurality of times in the first state and the connected state. In addition, the network device may indicate the terminal to perform state switching. After data transmission of the terminal is completed, the network device may indicate the terminal to enter the first state, which helps reduce power consumption of the terminal.

Figure 14:
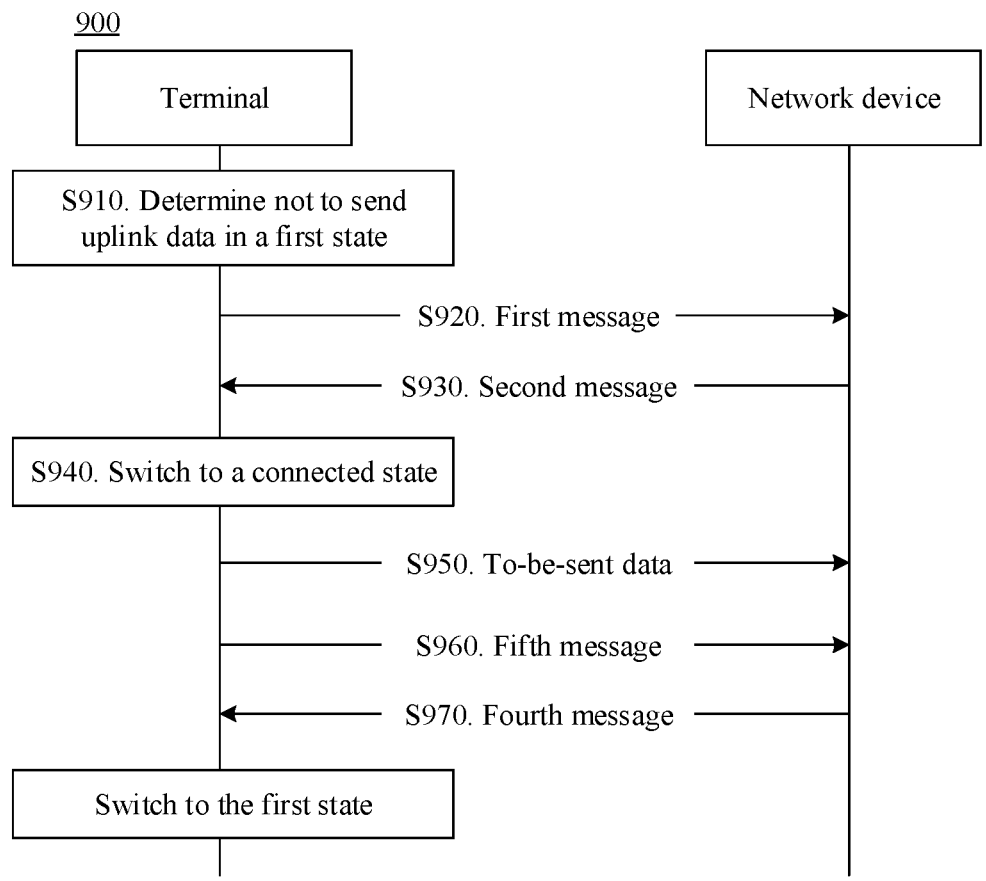
FIG. 14 is another schematic flowchart of a data transmission method according to an embodiment of this application.

FIG. 14 is a schematic flowchart of a data transmission method 900 according to an embodiment of this application. As shown in FIG. 14, the method 900 includes the following steps S910 to S970.

S910. A terminal determines not to send uplink data to a network device when the terminal is in a first state, where the first state is an idle state or an inactive state.

It should be understood that, when determining that any one or more of the preset condition 1 to the preset condition 4 are not met, the terminal may determine not to send the uplink data to the network device when the terminal is in the first state.

S920. The terminal state in the first state sends a first message to a network device, and the network device receives the first message sent by the terminal, where the first message includes first indication information, and the first indication information is used to indicate that there is to-be-sent data.

S930. The terminal receives a second message sent by the network device.

It should be understood that, for descriptions of the second message, refer to the descriptions in the foregoing method 700. For brevity, details are not described herein again.

S940. The terminal switches from the first state to a connected state.

S950. The terminal in the connected state sends the to-be-sent data to the network device.

S960. The terminal sends a fifth message to the network device, where the fifth message is used to indicate that an RRC resume process is completed or RRC establishment is completed.

For example, the fifth message is an RRC resume complete message or an RRC establishment complete message.

S970. The network device sends a fourth message to the terminal.

It should be understood that, for descriptions of the fourth message, refer to the descriptions in the foregoing method 500. For brevity, details are not described herein again.

It should be further understood that, before sending the fourth message to the terminal, the network device may further receive the fifth indication information, and the network device may send the fourth indication information to the terminal based on the third indication information and the fifth indication information. For a specific process, refer to the descriptions in the foregoing method 500. For brevity, details are not described herein again.

In this embodiment of this application, the terminal may send uplink data in the connected state. In addition, the network device may indicate the terminal to perform state switching. After data transmission of the terminal is completed, the network device may indicate the terminal to enter the first state, which helps reduce power consumption of the terminal.

Figure 15:
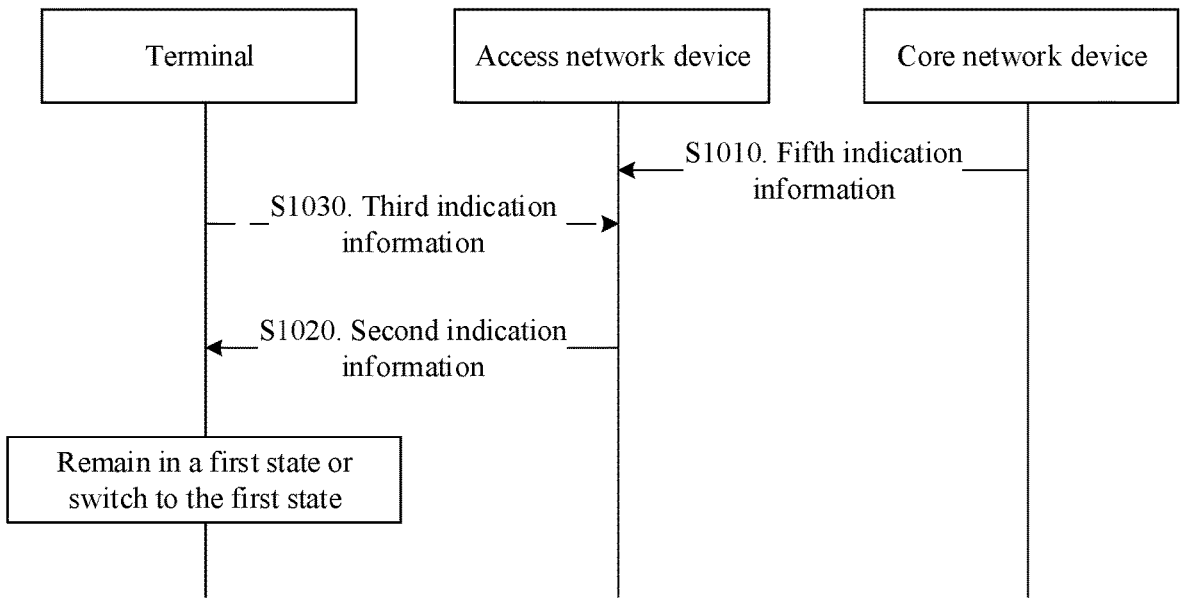
FIG. 15 is another schematic flowchart of a data transmission method according to an embodiment of this application.

FIG. 15 is a schematic flowchart of a data transmission method 1000 according to an embodiment of this application. As shown in FIG. 15, the method includes the following steps S1010 to S1030.

S1010. An access network device receives fifth indication information, where the fifth indication information is used to indicate that there is no downlink data of a terminal.

It should be understood that the access network device may be the network device in the foregoing embodiments.

Optionally, the access network device receives the fifth indication information from a core network device.

It should be understood that, that the fifth indication information is used to indicate that there is no downlink data of the terminal may also be understood as: The fifth indication information is used to indicate that the terminal has no downlink data to be received.

Optionally, the fifth indication information is used to indicate whether there is downlink data of the terminal, a value of the fifth indication information is a first value, and the first value is used to indicate that there is no downlink data of the terminal.

It should be further understood that, for descriptions of the fifth indication information, refer to the descriptions in the foregoing method 400. For brevity, details are not described herein again.

S1020. The access network device sends second indication information to the terminal based on the fifth indication information, where the second indication information is used to indicate the terminal to remain in or switch to a first state, and the first state includes an idle state or an inactive state.

When determining that there is no downlink data of the terminal, the access network device may indicate the terminal to continue to remain in the first state, or indicate the terminal to switch from a connected state to the first state.

Optionally, the method 1000 further includes the following step:

S1030. The access network device receives third indication information, where the third indication information is used to indicate that the terminal has no uplink data and/or there is no other downlink data of the terminal. That the access network device sends second indication information to the terminal based on the fifth indication information includes: The access network device sends the second indication information to the terminal based on the fifth indication information and the third indication information.

It should be understood that, for a process in which the access network device sends the second indication information to the terminal based on the fifth indication information and the third indication information, refer to the descriptions in the foregoing method 400. For brevity, details are not described herein again.

It should be further understood that the method 1000 in this embodiment of this application may be combined with any one of the foregoing method 400 to method 900.

In this embodiment of this application, when the terminal has no downlink data to be received, the access network device may indicate the terminal to continue to remain in the first state or indicate the terminal to switch to the first state. This helps reduce power consumption of the terminal.

The foregoing describes in detail the data transmission method according to the embodiments of this application with reference to FIG. 1 to FIG. 15. The following describes in detail a data transmission apparatus, a terminal, and a network device according to the embodiments of this application with reference to FIG. 16 to FIG. 22.

An embodiment of this application further provides an apparatus configured to implement any one of the foregoing methods. For example, an apparatus is provided. The apparatus includes units (or means) configured to implement the steps performed by the terminal in any one of the foregoing methods. For another example, another apparatus is further provided. The apparatus includes units (or means) configured to implement the steps performed by the network device in any one of the foregoing methods.

Figure 16:
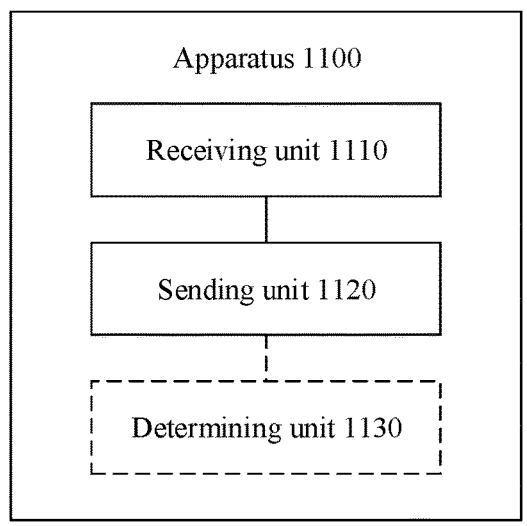
FIG. 16 is a schematic block diagram of a data transmission apparatus according to an embodiment of this application.

FIG. 16 is a schematic block diagram of a data transmission apparatus 1100 according to an embodiment of this application. As shown in FIG. 16, the data transmission apparatus 1100 may include a receiving unit 1110 and a sending unit 1120.

In a possible implementation, the data transmission apparatus 1100 may be the terminal in the method 400, the method 500, or the method 600, or may be a chip disposed in the terminal.

Specifically, the receiving unit 1110 is used by the terminal to receive a first uplink grant from a network device. The sending unit 1120 is configured to send first uplink data in to-be-sent data to the network device by using the first uplink grant. The receiving unit 1110 is further configured to receive a second uplink grant from the network device. The sending unit 1120 is further configured to send second uplink data to the network device by using the second uplink grant, where the second uplink data is at least a part of uplink data in the to-be-sent data except the first uplink data, the terminal is in a first state, and the first state includes an idle state or an inactive state.

In this embodiment of this application, the apparatus 1100 may send uplink data to the network device for a plurality of times when the apparatus is in the idle state or in the inactive state. Compared with a case in which the apparatus sends data to the network device after entering a connected state, this application helps reduce a quantity of times of air interface interaction and a data transmission latency.

Optionally, the sending unit 1120 is further configured to send first indication information to the network device, where the first indication information is used to indicate that the to-be-sent data is not completely sent.

In this embodiment of this application, the apparatus 1100 indicates to the network device that the to-be-sent data is not completely sent, so that the network device may indicate the apparatus 1100 to continue to remain in the first state to send uplink data. Compared with a case in which the apparatus 1100 sends data to the network device after entering the connected state, this application helps reduce a quantity of times of air interface interaction and a data transmission latency.

Optionally, the first indication information includes information used to indicate a data volume of remaining uplink data in the to-be-sent data.

In this embodiment of this application, the apparatus 1100 indicates the data volume of the to-be-sent data in the first indication information. This helps the network device determine whether a terminal state needs to be adjusted, and helps reduce a quantity of times of air interface interaction and a data transmission latency. In addition, if the network device determines that the data volume of the to-be-sent data is relatively small (where for example, the network device determines that the apparatus 1100 can send all of the to-be-sent data by using the second uplink grant), the network device may indicate the apparatus 1100 to continue to remain in the first state, thereby helping reduce power consumption of the terminal.

Optionally, the receiving unit 1110 is further configured to receive second indication information from the network device, where the second indication information is used to indicate the terminal to remain in the first state.

In this embodiment of this application, after receiving the first uplink data, the network device may indicate the apparatus 1100 to continue to remain in the first state. This helps reduce power consumption of the apparatus 1100.

Optionally, the sending unit 1120 is further configured to send third indication information to the network device, where the third indication information is used to indicate that sending of the to-be-sent data is completed. The receiving unit 1110 is further configured to receive fourth indication information from the network device, where the fourth indication information is used to indicate the terminal to remain in the first state.

In this embodiment of this application, after determining that the apparatus 1100 does not have other uplink data, the network device may indicate the apparatus 1100 to continue to remain in the first state. This helps reduce power consumption of the apparatus 1100.

Optionally, the sending unit 1120 is specifically configured to send a first message of a random access procedure to the network device, where the first message of the random access procedure includes the first uplink data.

The data transmission apparatus in this embodiment of this application may be applied to the random access procedure. The apparatus 1100 may include the first uplink data in the first message of random access, and the apparatus 1100 may send uplink data in the first state for a plurality of times. Compared with a case in which the apparatus 1100 sends data to the network device after entering the connected state, this application helps reduce a quantity of times of air interface interaction and a data transmission latency.

Optionally, the receiving unit 1110 is specifically configured to: receive a second message of the random access procedure from the network device, where the second message of the random access procedure includes the second uplink grant.

The data transmission apparatus in this embodiment of this application may be applied to the random access procedure. The network device may include the second uplink grant in the second message of the random access procedure, and the second uplink grant is used by the apparatus 1100 to newly transmit data. The apparatus 1100 may continue to send uplink data in the first state. This helps reduce a quantity of times of air interface interaction and a data transmission latency.

Optionally, the sending unit 1120 is specifically configured to send a first message of another random access procedure to the network device, where the first message of the another random access procedure message includes the second uplink data.

The data transmission apparatus in this embodiment of this application may be applied to the random access procedure. The apparatus 1100 may send the first message of the random access procedure to the network device for a plurality of times, and include uplink data in the first message of the random access procedure, to send the uplink data in the first state. This helps reduce a quantity of times of air interface interaction and a data transmission latency.

Optionally, the receiving unit 1110 is further configured to receive, from the network device, a second message of the random access procedure, where the second message of the random access procedure includes a third uplink grant, and the third uplink grant is used to retransmit the first uplink data. The sending unit 1120 is further configured to retransmit the first uplink data by using the third uplink grant.

Optionally, the second uplink grant is a preconfigured uplink grant.

Optionally, the apparatus 1100 further includes a determining unit 1130. The sending unit 1120 is specifically configured to send the first uplink data to the network device when the determining unit 1130 meets a preset condition. The determining unit 1130 is specifically configured to determine one or more of the following preset conditions: determine that the to-be-sent data exists; determine that the data volume of the to-be-sent data is less than or equal to a preset threshold; receive fifth indication information from the network device, where the fifth indication information is used to indicate that the terminal sends the to-be-sent data to the network device; and determine that the to-be-sent data is a service data unit SDU.

Optionally, the receiving unit 1110 is specifically configured to receive radio resource control RRC signaling from the network device, where the RRC signaling includes the first uplink grant.

Figure 17:
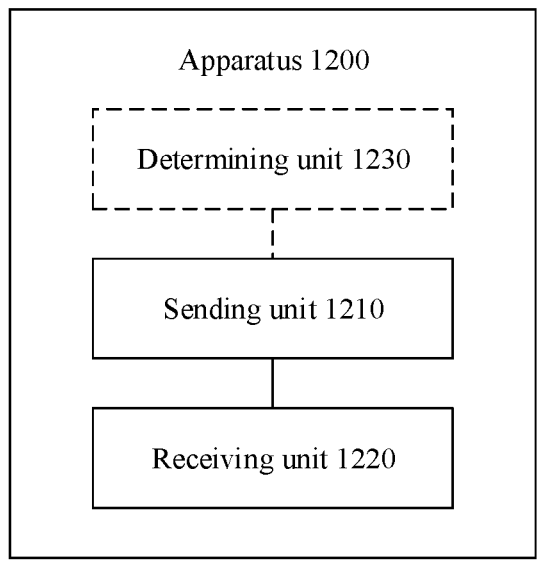
FIG. 17 is a schematic block diagram of a data transmission apparatus according to an embodiment of this application.

FIG. 17 is a schematic block diagram of a data transmission apparatus 1200 according to an embodiment of this application. As shown in FIG. 17, the data transmission apparatus 1200 may include a sending unit 1210 and a receiving unit 1220.

In a possible implementation, the data transmission apparatus may be the network device in the method 400, the method 500, or the method 600, or may be a chip disposed in the network device.

Specifically, the sending unit 1210 is configured to send a first uplink grant to a terminal. The receiving unit 1220 is configured to receive first uplink data in to-be-sent data sent by the terminal by using the first uplink grant. The sending unit 1210 is further configured to send a second uplink grant to the terminal. The receiving unit 1220 is further configured to receive second uplink data sent by the terminal by using the second uplink grant, where the second uplink data is at least a part of uplink data in the to-be-sent data except the first uplink data, the terminal is in a first state, and the first state includes an idle state or an inactive state.

Optionally, the receiving unit 1220 is further configured to receive first indication information from the terminal, where the first indication information is used to indicate that the to-be-sent data is not completely sent.

Optionally, the first indication information includes information used to indicate a data volume of remaining uplink data in the to-be-sent data.

Optionally, the sending unit 1210 is further configured to send second indication information to the terminal, where the second indication information is used to indicate the terminal to remain in the first state.

Optionally, the apparatus 1200 further includes a determining unit 1230. The receiving unit 1220 is further configured to receive third indication information from the terminal, where the third indication information is used to indicate that sending of the to-be-sent data is completed. The determining unit 1230 is configured to determine fourth indication information based on the third indication information. The sending unit 1210 is further configured to send the fourth indication information to the terminal, where the fourth indication information is used to indicate the terminal to remain in the first state.

Optionally, the receiving unit 1220 is further configured to receive fifth indication information, where the fifth indication information is used to indicate that there is no downlink data of the terminal. The determining unit 1230 is specifically configured to determine the fourth indication information based on the third indication information and the fifth indication information.

Optionally, the fifth indication information is used to indicate whether there is downlink data of the terminal, a value of the fifth indication information is a first value, and the first value is used to indicate that there is no downlink data of the terminal.

Optionally, the receiving unit 1220 is specifically configured to receive a first message of a random access procedure from the terminal, where the first message of the random access procedure includes the first uplink data.

Optionally, the sending unit 1210 is specifically configured to send a second message of the random access procedure to the terminal, where the second message of the random access procedure includes the second uplink grant.

Optionally, the receiving unit 1220 is specifically configured to receive a first message of another random access procedure from the terminal, where the first message of the another random access procedure message includes the second uplink data.

Optionally, the sending unit 1210 is further configured to send the second message of the random access procedure to the terminal, where the second message of the random access procedure includes a third uplink grant, and the third uplink grant is used to retransmit the first uplink data. The receiving unit 1220 is further configured to receive the first uplink data retransmitted by the terminal by using the third uplink grant.

Optionally, the second uplink grant is a preconfigured uplink grant.

Optionally, the sending unit 1210 is specifically configured to send RRC signaling to the terminal, where the RRC signaling includes the first uplink grant.

Figure 18:
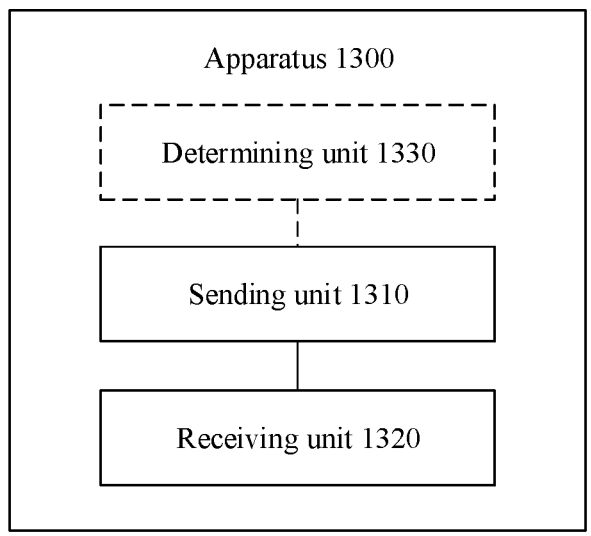
FIG. 18 is a schematic block diagram of a data transmission apparatus according to an embodiment of this application.

FIG. 18 is a schematic block diagram of a data transmission apparatus 1300 according to an embodiment of this application. As shown in FIG. 18, the data transmission apparatus 1300 may include a sending unit 1310 and a receiving unit 1320.

In a possible implementation, the data transmission apparatus 1300 may be the terminal in the method 700, the method 800, or the method 900, or may be a chip disposed in the terminal.

Specifically, the sending unit 1310 is configured to send first indication information to a network device when the apparatus is in a first state, where the first indication information is used to indicate that the terminal has to-be-sent data, and the first state includes an idle state or an inactive state. The receiving unit 1320 is configured to receive second indication information from the network device, where the second indication information is used to indicate the terminal to switch to a connected state. The sending unit 1310 is further configured to send the to-be-sent data to the network device in the connected state.

In this embodiment of this application, when the apparatus 1300 has to-be-sent data, the terminal may send the first indication information to the network device, and the network device may indicate in a timely manner the apparatus 1300 to switch from the first state to the connected state, to complete uplink data sending.

Optionally, the receiving unit 1320 is further configured to receive a first uplink grant from the network device. The sending unit 1310 is further configured to send first uplink data to the network device by using the first uplink grant when the apparatus is in the first state, where the first indication information is used to indicate that in addition to the first uplink data, the terminal has other to-be-sent data.

According to the data transmission apparatus in this embodiment of this application, the apparatus 1300 may send uplink data to the network device for a plurality of times when the terminal is in the first state and the connected state. Compared with a case in which the apparatus 1300 sends data to the network device after entering a connected state, this application helps reduce a quantity of times of air interface interaction and a data transmission latency.

Optionally, the sending unit 1310 is specifically configured to send a first message of a random access procedure to the network device, where the first message of the random access procedure includes the first uplink data.

The data transmission apparatus in this embodiment of this application may be applied to the random access procedure. The apparatus 1300 may include the first uplink data in the first message of random access, and the apparatus 1300 may send uplink data in the first state and the connected state for a plurality of times. Compared with a case in which the apparatus 1300 sends data to the network device after entering the connected state, this application helps reduce a quantity of times of air interface interaction and a data transmission latency.

Optionally, the apparatus 1300 further includes a determining unit 1330. The sending unit 1310 is specifically configured to send the first uplink data to the network device when the determining unit 1330 meets a preset condition. The determining unit 1330 is specifically configured to determine one or more of the following preset conditions: determine that the to-be-sent data exists; determine that the data volume of the to-be-sent data is less than or equal to a preset threshold; receive fifth indication information from the network device, where the fifth indication information is used to indicate that the terminal sends the to-be-sent data to the network device; and determine that the to-be-sent data is a service data unit SDU.

Optionally, the first message of the random access procedure further includes the first indication information.

Optionally, the receiving unit 1320 is specifically configured to: receive, by the terminal, RRC signaling from the network device, where the RRC signaling includes the first uplink grant.

Optionally, the receiving unit 1320 is specifically configured to: receive a second message of the random access procedure from the network device, where the second message of the random access procedure includes the second indication information.

Optionally, the sending unit 1310 is further configured to send third indication information to the network device, where the third indication information is used to indicate that sending of the to-be-sent data is completed. The receiving unit 1320 is further configured to receive fourth indication information from the network device, where the fourth indication information is used to indicate the terminal to switch to the first state.

Figure 19:
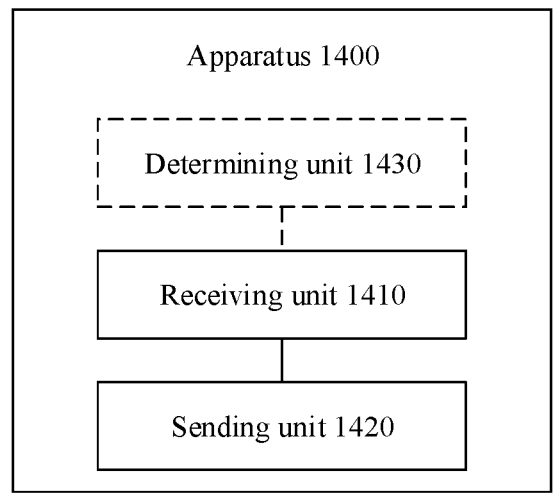
FIG. 19 is a schematic block diagram of a data transmission apparatus according to an embodiment of this application.

FIG. 19 is a schematic block diagram of a data transmission apparatus 1400 according to an embodiment of this application. As shown in FIG. 19, the data transmission apparatus 1400 may include a receiving unit 1410 and a sending unit 1420.

In a possible implementation, the data transmission apparatus may be the network device in the method 700, the method 800, or the method 900, or may be a chip disposed in the network device.

Specifically, the receiving unit 1410 is configured to receive first indication information from a terminal in a first state, where the first indication information is used to indicate that the terminal has to-be-sent data, and the first state includes an idle state or an inactive state. The sending unit 1420 is configured to send second indication information to the terminal, where the second indication information is used to indicate the terminal to switch to a connected state. The receiving unit 1410 is further configured to receive the to-be-sent data sent by the terminal in the connected state.

Optionally, the sending unit 1420 is further configured to send a first uplink grant to the terminal. The receiving unit 1410 is further configured to receive first uplink data sent by the terminal in the first state by using the first uplink grant, where the first indication information is used to indicate that in addition to the first uplink data, the terminal has other to-be-sent data.

Optionally, the receiving unit 1410 is specifically configured to receive a first message of a random access procedure from the terminal, where the first message of the random access procedure includes the first uplink data.

Optionally, the first message of the random access procedure further includes the first indication information.

Optionally, the sending unit 1420 is specifically configured to send RRC signaling to the terminal, where the RRC signaling includes the first uplink grant.

Optionally, the sending unit 1420 is specifically configured to send a second message of the random access procedure to the terminal, where the second message of the random access procedure includes the second indication information.

Optionally, the apparatus 1400 further includes a determining unit 1430. The receiving unit 1410 is further configured to receive third indication information from the terminal, where the third indication information is used to indicate that sending of the to-be-sent data is completed. The determining unit 1430 is configured to determine fourth indication information based on the third indication information, where the fourth indication information is used to indicate the terminal to switch to the first state. The sending unit 1420 is further configured to send the fourth indication information to the terminal.

Optionally, the receiving unit 1410 is further configured to receive fifth indication information, where the fifth indication information is used to indicate that there is no downlink data of the terminal. The determining unit 1430 is specifically configured to determine the fourth indication information based on the third indication information and the fifth indication information.

Optionally, the fifth indication information is used to indicate whether there is downlink data of the terminal, a value of the fifth indication information is a first value, and the first value is used to indicate that there is no downlink data of the terminal.

Figure 20:
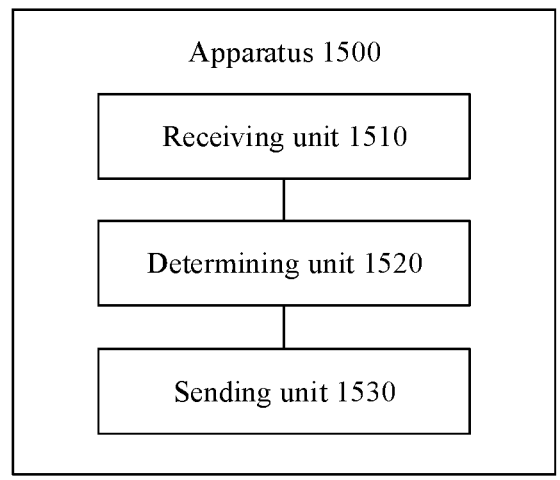
FIG. 20 is a schematic block diagram of a data transmission apparatus according to an embodiment of this application.

FIG. 20 is a schematic block diagram of a data transmission apparatus 1500 according to an embodiment of this application. As shown in FIG. 20, the data transmission apparatus 1500 may include a receiving unit 1510, a determining unit 1520, and a sending unit 1530.

In a possible implementation, the data transmission apparatus may be the network device in the method 1000, or may be a chip disposed in the network device.

Specifically, the receiving unit 1510 is configured to receive first indication information, where the first indication information is used to indicate that there is no downlink data of a terminal. The determining unit 1520 is configured to determine second indication information based on the first indication information, where the second indication information is used to indicate the terminal to remain in or switch to a first state, and the first state includes an idle state or an inactive state. The sending unit 1530 is configured to send the second indication information to the terminal.

Optionally, the receiving unit 1510 is further configured to receive third indication information, where the third indication information is used to indicate that the terminal has no uplink data. The determining unit 1520 is specifically configured to determine the second indication information based on the first indication information and the third indication information.

Optionally, the first indication information is used to indicate whether there is downlink data of the terminal, a value of the first indication information is a first value, and the first value is used to indicate that there is no downlink data of the terminal.

It should be understood that division of the foregoing apparatuses into units is merely division into logical functions. During actual implementation, all or some of the units may be integrated into one physical entity or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more specific integrated circuits (ASICs), one or more microprocessors (digital signal processors, DSPs), one or more field programmable gate arrays (FPGAs), or a combination of at least two of the integrated circuits. For another example, when a unit in the apparatus is implemented by a program scheduled by a processing element, the processing element may be a general-purpose processor, for example, a central processing unit (CPU) or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 21:
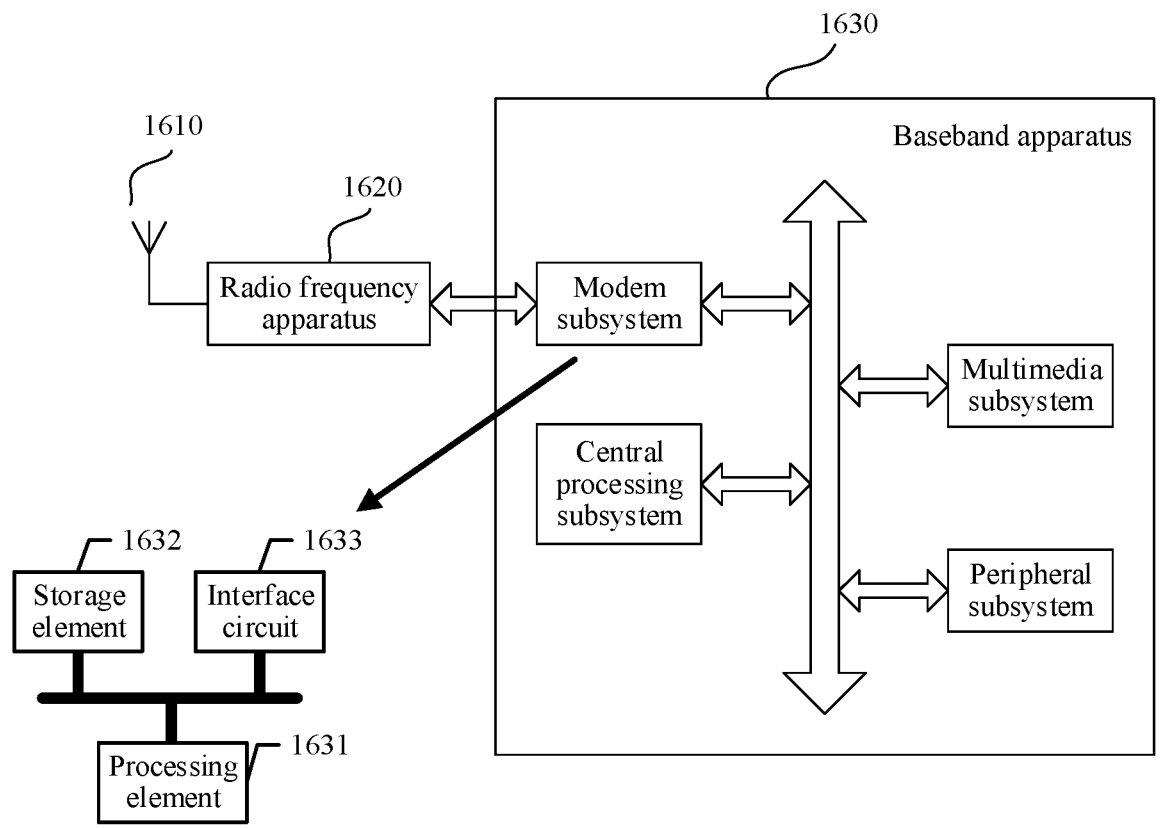
FIG. 21 is a schematic diagram of a structure of a terminal according to an embodiment of this application.

FIG. 21 is a schematic diagram of a structure of a terminal according to an embodiment of this application. The terminal may be the terminal in the foregoing embodiments and is configured to implement operations of the terminal in the foregoing embodiments. As shown in FIG. 21, the terminal includes an antenna 1610, a radio frequency part 1620, and a signal processing part 1630. The antenna 1610 is connected to the radio frequency part 1620. In a downlink direction, the radio frequency part 1620 receives, through the antenna 1610, information sent by a network device, and sends, to the signal processing part 1630 for processing, the information sent by the network device. In an uplink direction, the signal processing part 1630 processes information of the terminal, and sends the information to the radio frequency part 1620. The radio frequency part 1620 processes the information of the terminal, and then sends processed information to the network device by using the antenna 1610.

The signal processing part 1630 may include a modem subsystem, configured to process data at each communication protocol layer. The signal processing part may further include a central processing subsystem, configured to implement processing of an operating system and an application layer of the terminal. In addition, the signal processing part may further include another subsystem, for example, a multimedia subsystem or a peripheral subsystem. The multimedia subsystem is configured to control a camera or a screen display of the terminal, and the peripheral subsystem is configured to implement a connection to another device. The modem subsystem may be a separately disposed chip. Optionally, the foregoing apparatus used in the terminal may be located in the modem subsystem.

The modem subsystem may include one or more processing elements 1631, for example, include one main control CPU and another integrated circuit. In addition, the modem subsystem may further include a storage element 1632 and an interface circuit 1633. The storage element 1632 is configured to store data and a program. However, a program used to perform the methods performed by the terminal in the foregoing methods may not be stored in the storage element 1632, but is stored in a memory outside the modem subsystem, and is loaded and used by the modem subsystem when to be used. The interface circuit 1633 is configured to communicate with another subsystem. The foregoing apparatus used for the terminal may be located in the modem subsystem. The modem subsystem may be implemented by using a chip. The chip includes at least one processing element and interface circuit. A processing element is configured to perform the steps of any method performed by the terminal. An interface circuit is configured to communicate with another apparatus. In an implementation, units of the terminal that implement the steps in the foregoing methods may be implemented by a processing element invoking a program. For example, the apparatus used for the terminal includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In another implementation, the program used to perform the methods performed by the terminal in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiments.

In still another implementation, units of the terminal that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal that implement the steps in the foregoing methods may be integrated together and implemented in a form of an SOC, and the SOC chip is configured to implement the foregoing methods. At least one processing element and storage element may be integrated into the chip, and a processing element invokes a program stored in a storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by the processing element invoking a program, and functions of some units may be implemented by the integrated circuit.

It can be learned that the foregoing apparatus used for the terminal may include at least one processing element and interface circuit. The at least one processing element is configured to perform any one of the methods that are provided in the foregoing method embodiments and performed by the terminal. The processing element may perform some or all steps performed by the terminal, in a first manner, to be specific, by invoking the program stored in the storage element; or may perform some or all steps performed by the terminal, in a second manner, to be specific, by using a hardware integrated logic circuit in the processor element in combination with instructions; or may certainly perform, by combining the first manner and the second manner, some or all steps performed by the terminal.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

Figure 22:
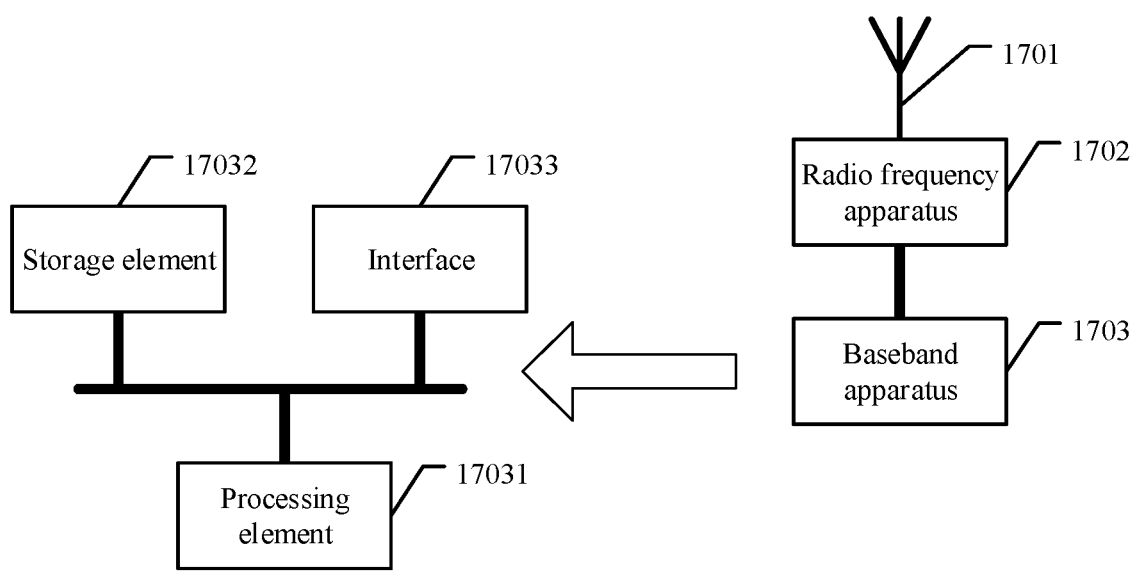
FIG. 22 is a schematic diagram of a structure of a network device according to an embodiment of this application.

FIG. 22 is a schematic diagram of a structure of a network device according to an embodiment of this application. The network device is configured to implement operations of the network device in the foregoing embodiments. As shown in FIG. 22, the network device includes an antenna 1701, a radio frequency apparatus 1702, and a baseband apparatus 1703. The antenna 1701 is connected to the radio frequency apparatus 1702. In an uplink direction, the radio frequency apparatus 1702 receives, by using the antenna 1701, information sent by a terminal, and sends, to the baseband apparatus 1703 for processing, the information sent by the terminal. In a downlink direction, the baseband apparatus 1703 processes the information of the terminal, and sends the information to the radio frequency apparatus 1702. The radio frequency apparatus 1702 processes the information of the terminal, and then sends processed information to the terminal by using the antenna 1701.

The baseband apparatus 1703 may include one or more processing elements 17031, for example, include one main control CPU and another integrated circuit. In addition, the baseband apparatus 1703 may further include a storage element 17032 and an interface 17033. The storage element 17032 is configured to store a program and data. The interface 17033 is configured to exchange information with the radio frequency apparatus 1702, and the interface is, for example, a common public radio interface (CPRI). The foregoing apparatus used for the network device may be located in the baseband apparatus 1703. For example, the foregoing apparatus used for the network device may be a chip on the baseband apparatus 1703. The chip includes at least one processing element and interface circuit. The processing element is configured to perform the steps of any one of the methods performed by the network device. The interface circuit is configured to communicate with another apparatus. In an implementation, units of the network device that implement the steps in the foregoing methods may be implemented by a processing element invoking a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In another implementation, units of the network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of an SOC. For example, the baseband apparatus includes an SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by the processing element invoking a program, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with instructions; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

The terminal and the network device in the foregoing apparatus embodiments may completely correspond to the terminal or the network device in the method embodiments, and a corresponding module or unit performs a corresponding step. For example, when the apparatus is implemented in a chip manner, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

An embodiment of this application further provides a communication system. The communication system includes the foregoing terminal and/or the foregoing network device.

In the embodiments of this application, it should be noted that the method embodiments in the embodiments of this application may be applied to a processor, or implemented by a processor. The processor may be an integrated circuit chip and has a signal processing capability. In an implementation process, the steps in the foregoing method embodiments may be completed by using a hardware integrated logic circuit in a processor or instructions in a form of software. The foregoing processor may be a general purpose processor, a DSP, an ASIC, an FPGA or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with the hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct Rambus RAM, DR RAM). It should be noted that, the memory in the system and method described in this specification includes but is not limited to these memories and any memory of another proper type.

It should be understood that "one embodiment" or "an embodiment" mentioned in the specification means that particular features, structures, or characteristics related to the embodiments are included in at least one embodiment of this application. Therefore, "in one embodiment" or "in an embodiment" appearing in the entire specification does not refer to a same embodiment. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

The terms "first", "second", and the like in this application are merely used to distinguish different objects, and "first" and "second" do not limit an actual sequence or functions of objects modified by "first" and "second". Expressions such as "example", "for example", "such as", "optional design", and "a design" in this application are merely used to represent examples, instances, or descriptions. Any embodiment or design scheme described as "example", "for example", "such as", "optional design", or "a design" in this application should not be explained as being more preferred or having more advantages than another embodiment or design scheme. To be specific, these terms are used to present a related concept in a specific manner.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a central unit; and a "downlink" direction is usually a direction in which data/information is transmitted from a network side to a terminal, or a direction in which data/information is transmitted from a central unit to a distributed unit. It can be understood that "uplink" and "downlink" are merely used to describe a data/information transmission direction, without limiting a specific starting or ending device of data/information transmission.

Unless otherwise specified, an expression used in this application similar to an expression that "including at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. The foregoing uses three elements A, B, and C as an example to describe an optional entry of the item. When the expression is "the item includes at least one of the following: A, B, . . . , and X", in other words, more elements are included in the expression, the entry to which the item is applicable may also be obtained according to the foregoing rule.

In this application, names may be assigned to various objects such as messages, information, devices, network elements, systems, apparatuses, actions, operations, procedures, and concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied or performed by the technical terms in the technical solutions.

In the embodiments of this application, architectures of the CU and the DU are not limited to the 5G NR gNB, and may be further applied to a scenario in which an LTE base station is divided into the CU and the DU. The CU may be further divided into two parts: a CP and a UP. Optionally, in the LTE base station, the protocol layer does not include an SDAP layer.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" appearing in the entire specification does not refer to a same embodiment. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

In addition, the terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "I" in this specification usually indicates an "or" relationship between the associated objects.

The network architecture and the service scenario described in the embodiments of this application are intended to make readers understand the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

All or a part of the foregoing embodiments may be implemented by software, hardware, firmware, or any combination thereof. When software is used to implement the embodiments, all or some of the embodiments may be implemented in a form of a computer program product. The computer program product may include one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A data transmission method, comprising:
receiving, by a terminal, a first uplink grant from a network device;
sending, by the terminal, first uplink data in to-be-sent data to the network device by using the first uplink grant;
receiving, by the terminal, a second uplink grant from the network device; and
sending, by the terminal, second uplink data to the network device by using the second uplink grant, wherein the second uplink data is at least a part of uplink data in the to-be-sent data except the first uplink data;

wherein the terminal is in a first state, and the first state comprises an idle state or an inactive state; and wherein the sending the first uplink data in the to-be-sent data to the network device comprises sending the first uplink data to the network device in response to the terminal determining that a preset condition is met, wherein the terminal determining that the preset condition is met comprises the terminal performing one or more of the following:

the terminal determining that the to-be-sent data exists;
the terminal determining that a data volume of the to-be-sent data is less than or equal to a preset threshold;
the terminal receiving fifth indication information from the network device, wherein the fifth indication information is used to indicate the terminal to send the to-be-sent data to the network device; or
the terminal determining that the to-be-sent data is a service data unit (SDU).

2. The method according to claim 1, wherein the method further comprises:

sending, by the terminal, first indication information to the network device, wherein the first indication information is used to indicate that the to-be-sent data is not completely sent.

3. The method according to claim 2, wherein the first indication information comprises information used to indicate a data volume of remaining uplink data in the to-be-sent data.

4. The method according to claim 1, wherein the method further comprises:

receiving, by the terminal, second indication information from the network device, wherein the second indication information is used to indicate the terminal to remain in the first state.

5. The method according to claim 1, wherein the method further comprises:

sending, by the terminal, third indication information to the network device, wherein the third indication information is used to indicate that sending of the to-be-sent data is completed; and
receiving, by the terminal, fourth indication information from the network device, wherein the fourth indication information is used to indicate the terminal to remain in the first state.

6. The method according to claim 1, wherein the sending first uplink data in to-be-sent data to the network device comprises:

sending, by the terminal, a first message of a random access procedure to the network device, wherein the first message of the random access procedure comprises the first uplink data.

7. The method according to claim 1, wherein the receiving, by the terminal, the second uplink grant from the network device comprises:

receiving, by the terminal from the network device, a second message of a random access procedure, wherein the second message of the random access procedure comprises the second uplink grant.

8. The method according to claim 1, wherein the second uplink grant is a preconfigured uplink grant.

9. The method according to claim 1, wherein the receiving, by the terminal, the first uplink grant from the network device comprises:

receiving, by the terminal, radio resource control (RRC) signaling from the network device, wherein the RRC signaling comprises the first uplink grant.

10. An apparatus, comprising:
one or more processors; and
a non-transitory memory coupled to the one or more processors, wherein the non-transitory memory stores a program to be executed by the one or more processors, the program including instructions for:
sending a first uplink grant to a terminal;
receiving first uplink data that is in to-be-sent data from the terminal by using the first uplink grant;
sending a second uplink grant to the terminal; and
receiving second uplink data from the terminal by using the second uplink grant, wherein the second uplink data is at least a part of uplink data in the to-be-sent data except the first uplink data;
wherein the terminal is in a first state, and the first state comprises an idle state or an inactive state; and
wherein the first uplink data in the to-be-sent data is received in response to a preset condition being met, wherein the preset condition being met comprises one or more of the following:
the terminal determining that the to-be-sent data exists;
a data volume of the to-be-sent data is less than or equal to a preset threshold;
the network device sending fifth indication information to the terminal, wherein the fifth indication information is used to indicate the terminal to send the to-be-sent data to the network device; or
the to-be-sent data is a service data unit (SDU).

11. The apparatus according to claim 10, wherein the program further includes instructions for:
receiving, first indication information from the terminal, wherein the first indication information is used to indicate that the to-be-sent data is not completely sent.

12. The apparatus according to claim 11, wherein the first indication information comprises information used to indicate a data volume of remaining uplink data in the to-be-sent data.

13. The apparatus according to claim 10, wherein the program further includes instructions for:
sending second indication information to the terminal, wherein the second indication information is used to indicate the terminal to remain in the first state.

14. The apparatus according to claim 10, wherein the program further includes instructions for:
receiving third indication information from the terminal, wherein the third indication information is used to indicate that sending of the to-be-sent data is completed; and
sending fourth indication information to the terminal based on the third indication information, wherein the fourth indication information is used to indicate the terminal to remain in the first state.

15. The apparatus according to claim 14, wherein the program further includes instructions for:
receiving fifth indication information, wherein the fifth indication information is used to indicate that there is no downlink data of the terminal; and
wherein the sending fourth indication information to the terminal based on the third indication information comprises:
sending the fourth indication information to the terminal based on the third indication information and the fifth indication information.

16. The apparatus according to claim 15, wherein the fifth indication information is used to indicate whether there is downlink data of the terminal, a value of the fifth indication information is a first value, and the first value is used to indicate that there is no downlink data of the terminal.

17. The apparatus according to claim 10, wherein the receiving the first uplink data that is in the to-be-sent data from the terminal by using the first uplink grant comprises:
receiving a first message of a random access procedure from the terminal, wherein the first message of the random access procedure comprises the first uplink data.

18. The apparatus according to claim 10, wherein the sending the second uplink grant to the terminal comprises:
sending a second message of the random access procedure to the terminal, wherein the second message of the random access procedure comprises the second uplink grant.

19. The apparatus according to claim 10, wherein the sending the first uplink grant to the terminal comprises:
sending radio resource control (RRC) signaling to the terminal, wherein the RRC signaling comprises the first uplink grant.

20. An apparatus, comprising:
one or more processors; and
a non-transitory memory coupled to the one or more processors, wherein the non-transitory memory stores a program to be executed by the one or more processors, the program including instructions for:
receiving a first uplink grant from a network device;
sending first uplink data in to-be-sent data to the network device by using the first uplink grant;
receiving a second uplink grant from the network device; and
sending second uplink data to the network device by using the second uplink grant, wherein the second uplink data is at least a part of uplink data in the to-be-sent data except the first uplink data;
wherein the sending first uplink data in to-be-sent data to the network device comprises sending the first uplink data to the network device in response to determining that a preset condition is met, wherein determining that the preset condition is met comprises performing one or more of the following:
determining that the to-be-sent data exists;
determining that a data volume of the to-be-sent data is less than or equal to a preset threshold;
receiving fifth indication information from the network device, wherein the fifth indication information is used to indicate the terminal to send the to-be-sent data to the network device; or
determining that the to-be-sent data is a service data unit (SDU).

21. The apparatus according to claim 20, wherein the program further includes instructions for:
sending third indication information to the network device, wherein the third indication information is used to indicate that sending of the to-be-sent data is completed.

* * * * *